United States Patent
Gutierrez et al.

(10) Patent No.: US 10,156,987 B1
(45) Date of Patent: Dec. 18, 2018

(54) TEMPERATURE MANAGEMENT IN A DATA STORAGE SYSTEM

(71) Applicant: Amazon Technologies, Inc., Seattle, WA (US)

(72) Inventors: Felipe Enrique Ortega Gutierrez, Tacoma, WA (US); Darin Lee Frink, Lake Tapps, WA (US)

(73) Assignee: Amazon Technologies, Inc., Seattle, WA (US)

( * ) Notice: Subject to any disclaimer, the term of this patent is extended or adjusted under 35 U.S.C. 154(b) by 45 days.

(21) Appl. No.: 14/752,799

(22) Filed: Jun. 26, 2015

(51) Int. Cl.
G06F 3/06 (2006.01)
G06F 11/30 (2006.01)
G06F 1/20 (2006.01)

(52) U.S. Cl.
CPC ............ *G06F 3/0604* (2013.01); *G06F 1/206* (2013.01); *G06F 3/0653* (2013.01); *G06F 3/0689* (2013.01); *G06F 11/3034* (2013.01); *G06F 11/3058* (2013.01); *G06F 11/3062* (2013.01)

(58) Field of Classification Search
CPC .... G06F 3/0604; G06F 3/0653; G06F 3/0689; G06F 11/3062; G06F 11/3058; G06F 11/3034; G06F 1/3206; G06F 1/3287
See application file for complete search history.

(56) References Cited

U.S. PATENT DOCUMENTS

| | | | | |
|---|---|---|---|---|
| 2002/0062454 A1* | 5/2002 | Fung | ..................... | G06F 1/3203 713/300 |
| 2002/0113617 A1* | 8/2002 | Gergintschw | ...... | H03K 17/0822 326/32 |
| 2005/0166075 A1* | 7/2005 | Hack | ....................... | G06F 1/206 713/320 |
| 2005/0210896 A1* | 9/2005 | Durant | .................... | G06F 1/206 62/178 |
| 2005/0268121 A1* | 12/2005 | Rothman | .............. | G06F 1/3221 713/300 |
| 2006/0168975 A1* | 8/2006 | Malone | .................. | F24F 11/001 62/180 |
| 2007/0067657 A1* | 3/2007 | Ranganathan | ........ | G06F 1/3296 713/320 |
| 2008/0005469 A1* | 1/2008 | Pherson | ............... | G11B 19/046 711/114 |
| 2011/0224837 A1* | 9/2011 | Moss | ....................... | G06F 1/206 700/295 |
| 2015/0363109 A1* | 12/2015 | Frick | ..................... | G06F 1/3203 711/112 |

* cited by examiner

*Primary Examiner* — Rocio Del Mar Perez-Velez
(74) *Attorney, Agent, or Firm* — Robert C. Kowert; Meyertons, Hood, Kivlin, Kowert & Goetzel, P.C.

(57) ABSTRACT

Techniques are described for managing temperatures within a data storage system by selectively interrupting power to one or more components of the data storage system. Temperature sensors measure the temperature of various components included in racks of a data center, such as data storage modules, backplanes of data storage modules, or mass storage devices coupled to backplanes. A control device may determine that a thermal event, such as a higher than threshold temperature, is occurring in one or more components. The control device may emit signal(s) to instruct power distribution unit(s) to selectively interrupt or reduce the power sent to those component(s) exhibiting the thermal event. The components may also be instructed to reduce a number of operations being performed. In some cases, fan speeds may be selectively adjusted to cool the component(s) and thus mitigate the thermal event. Power consumption may be employed to infer the temperature of component(s).

17 Claims, 12 Drawing Sheets

TEMPERATURE MANAGEMENT IN A DATA STORAGE SYSTEM

BACKGROUND

Organizations such as online retailers, Internet service providers, search providers, financial institutions, universities, and other computing-intensive organizations often conduct computer operations from large scale computing facilities. Such computing facilities may house a large number of servers, storage devices, network appliances, and other computer equipment to store, process, and communicate data related to an organization's operations. A computer room of a computing facility may include many racks housing any number of servers, storage devices, other computing devices, and associated computer equipment. The computing devices may generate a large amount of waste heat during their operations. For example, a motherboard of a computing device may include a central processing unit that generates heat. As another example, mass storage devices may include hard disk drives comprising motors or other components that generate heat during their operation. At least a portion of this heat is removed from the vicinity of the devices to enable the devices to continue operating. The amount of heat generated by the central processing units, hard disk drives, or other components within a computer room may be substantial and may lead to operational challenges.

Figure 1:
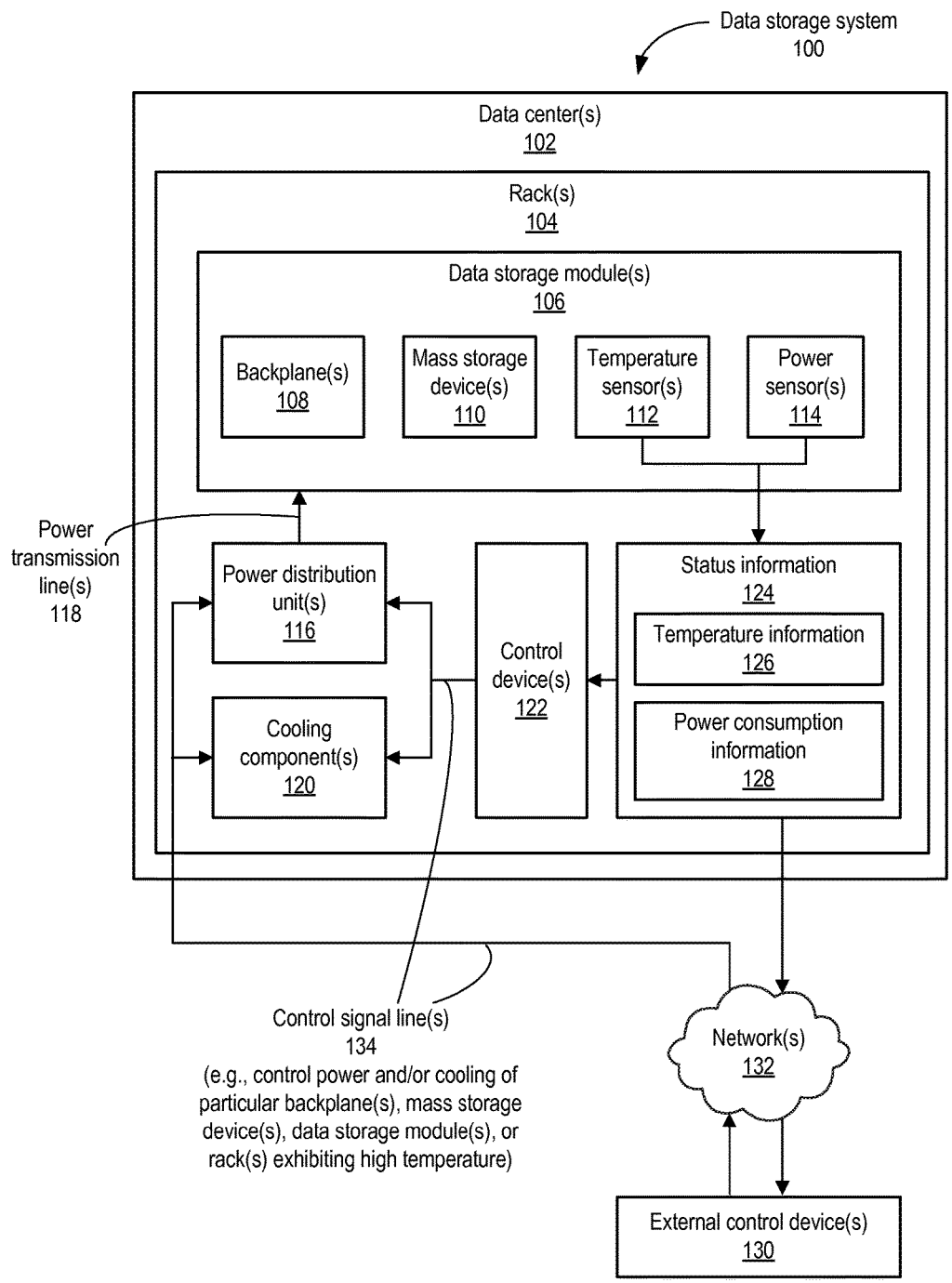
FIG. 1 is a schematic diagram illustrating an example data storage system comprising a data center, one or more racks in the data center, and one or more data storage modules in the rack(s).

The various embodiments described herein are susceptible to various modifications and alternative forms. Specific embodiments are shown by way of example in the drawings and will herein be described in detail. It should be understood, however, that the drawings and detailed description thereto are not intended to limit the disclosure to the particular form disclosed, but on the contrary, the intention is to cover all modifications, equivalents and alternatives falling within the spirit and scope of the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION OF EMBODIMENTS

This disclosure describes various embodiments of systems, apparatuses, methods, and computer-readable media for monitoring the temperature of one or more components of a data storage system, and performing action(s) in response to detecting thermal events occurring in the data storage system. A thermal event may be characterized by a temperature exceeding a threshold temperature, where the temperature is the measured or determined temperature of one or more components such as a rack, a data storage module of a rack, a backplane of a data storage module, or a mass storage device in a data storage module. A thermal event may also be characterized by a faster than threshold increase in temperature, such as a temperature spike. In response to detecting a thermal event, one or more control modules may emit signal(s) to cause action(s) such as shutting off the power to one or more components or adjusting the speed of cooling component(s) (e.g., fan(s)).

Various embodiments enable one or more particular sets of components, described herein as component group(s), to be shut down or selectively cooled by cooling components (e.g., fans) in response to a detected thermal event. By taking such actions with regard to a subset of the components housed in a rack, instead of an entire rack or an entire data center, various embodiments provide for fine-tuned temperature control within a data center. Accordingly, some embodiments may enable a data storage system to be operated with higher availability and greater storage capacity than in cases where an entire rack or multiple racks are shut down in response to a thermal event.

As used herein, a "circuit board" may describe any board or plate that has one or more electrical conductors transmitting power, data, or signals from components on or coupled to the circuit board to other components on the board or to external components. In some embodiments, a circuit board is an epoxy glass board with one or more conductive layers therein. A circuit board may, however, be made of any suitable combination of materials.

As used herein, a "chassis" may describe any structure or element that supports another element or to which other elements may be mounted. A chassis may have any shape or construction, including a frame, a sheet, a plate, a box, a channel, or any combination thereof. In some embodiment, a chassis is made from one or more sheet metal parts. A chassis for a computer system may support circuit board assemblies, power supply units, data storage devices, fans, cables, and other components of the computer system.

As used herein, "computing" includes any operations that may be performed by a computer, such as computation, data storage, data retrieval, or communications.

As used herein, a "computer system" may include any of various computer systems or components thereof. One example of a computer system is a rack-mounted server. As used herein, the term computer is not limited to just those integrated circuits referred to in the art as a computer, but broadly refers to a processor, a server, a microcontroller, a microcomputer, a programmable logic controller (PLC), an application specific integrated circuit, and other programmable circuits, and these terms are used interchangeably herein. In the various embodiments, memory may include, but is not limited to, a computer-readable medium, such as a random access memory (RAM). Alternatively, a compact disc—read only memory (CD-ROM), a magneto-optical disk (MOD), and/or a digital versatile disc (DVD) may also be used. Also, additional input channels may include computer peripherals associated with an operator interface such as a mouse and a keyboard. Alternatively, other computer peripherals may also be used that may include, for example, a scanner. Furthermore, in the some embodiments, additional output channels may include an operator interface monitor and/or a printer.

As used herein, a "module" includes a component or a combination of components physically coupled to one another. A module may include functional elements and systems, such as computer systems, circuit boards, racks, blowers, ducts, and power distribution units, as well as structural elements, such a base, frame, housing, or container.

As used herein, "mounting" a particular element on another element refers to positioning the particular element to be in physical contact with the other element, such that the other element provides one or more of structural support, positioning, structural load transfer, stabilization, shock absorption, some combination thereof, or the like with regard to the particular element. The mounted particular element may be positioned to rest upon one or more upper surfaces of the other element, independent of coupling the elements via one or more coupling elements. In some embodiments, mounting the particular element to another element includes coupling the elements such that the other element provides one or more of structural support, positioning, structural load transfer, stabilization, shock absorption, some combination thereof, or the like with regard to the particular element.

As used herein, "horizontal" or "primarily horizontal," also interchangeably referred to hereinafter as "horizontally-oriented," means at least more horizontal than vertical. In the context of an installed element or device, "horizontal," "primarily horizontal," or "horizontally-oriented" includes an element or device for which its installed width is greater than its installed height. In some embodiments, a horizontal or horizontally-oriented element or device is fully horizontal.

As used herein, "vertical" or "primarily vertical," also interchangeably referred to hereinafter as "vertically-oriented," means at least more vertical than horizontal. In the context of an installed element or device, "vertical," "primarily vertical," or "vertically-oriented" includes an element or device for which its installed height is greater than its installed width. In the context of a mass storage device, "vertical," "primarily vertical," or "vertically-oriented" includes a mass storage device that is installed such that the installed height of the mass storage device is greater than the installed width of the mass storage device. In some embodiments, a vertical or vertically-oriented element or device is fully vertical.

As used herein, a "rack" may include a rack, container, frame, or other element or combination of elements that can contain or physically support one or more computer systems.

As used herein, "room" may include a room or a space of a building. As used herein, "computer room" means a room of a building in which computer systems, such as rack-mounted servers, are operated.

As used herein, a "space" describes a space, area or volume.

As used herein, "shelf" may include any element or combination of elements on which an object can be rested. A shelf may include, for example, a plate, a sheet, a tray, a disc, a block, a grid, or a box. A shelf may be rectangular, square, round, or another shape. In some embodiments, a shelf may be one or more rails.

As used herein, "shock absorbing," as applied to a supporting element for another element, means that the supporting element absorbs mechanical energy or at least partially mitigates one or more of shock or vibration loads. A shock-absorbing material may be elastic, viscoelastic, viscous, or combinations thereof.

FIG. 1 is a schematic diagram illustrating an example data storage system 100 according to exemplary embodiments. As shown in FIG. 1, the data storage system 100 may include any number of data centers 102 that house computing device(s). Each data center 102 may include any number of computer rooms, or server rooms, which may be at any number of physical locations. The data center(s) 102 may house any number of computing devices configured to perform operations for an online retail service, an Internet service provider, a search provider, a financial institutions, a university, a social network provider, other types of businesses, or any other organization that employs computing resources. Each data center 102 may include any number of power distribution systems that provide electrical power to the computing devices or other components included in the data center 102. A power distribution system may include one or more various power distribution components, including but not limited to one or more of an uninterruptible power supply (UPS), a power distribution unit (PDU), a transformer, an automatic transfer switch (ATS), a switching device, switchgear, a circuit breaker, and so forth. A data center 102 may receive electrical power from one or more power feeds, including one or more utility power sources, generators, batteries, or other power sources. In some embodiments, a power distribution system may include infrastructure such as one or more power lines, power busways, bus bars, power transmission lines, power cables, and so forth.

A data center 102 may include one or more racks 104, which may also be described as rack computer systems, server racks, and so forth. Each rack 104 may include any number of data storage modules 106. A data storage module 106 may comprise any number of backplanes 108. Each backplane 108 may include any number of mass storage devices 110 mounted to the backplane 108. A mass storage device 110 may be any type of device configured to store any amount of data. The rack(s) 104, data storage module(s) 106, and mass storage device(s) 110 are described further with reference, respectively, to FIGS. 2, 3, and 4.

In some embodiments, a rack 104 may also include one or more PDUs 116. A PDU 116 may receive electrical power that is supplied to the rack 104 via the power distribution system and infrastructure of a data center 102. The PDU 116 may distribute power to components and subcomponents of the rack 104 such as the backplane(s) 108 and mass storage device(s) 110. For example, a PDU 116 may be electrically coupled to the power distribution system or infrastructure of a data center 102, and the PDU 116 may be coupled, via one or more power transmission lines 118, to the data storage module(s) 106, backplane(s) 108, or mass storage device(s) 110 to supply power to such component(s).

In some embodiments, a rack 104 may include any number of cooling component(s) 120 that are operable to control the temperature of the rack 104 and its various components. The cooling component(s) 120 may include any number of air moving devices such as fans, blowers, or compressed air systems that may induce an airflow through the component(s) of the rack(s) 104 to remove heat from heat producing components. Although examples may describe the cooling component(s) 120 as fan(s) or other air moving device(s), implementations are not so limited. Cooling component(s) 120 may also include a fluid circulation system, a heat exchanger, or other device that circulates a coolant fluid, via one or more conduits, through one or more portions of a rack 104 such that the circulated fluid removes heat from one or more portions of the rack 104. The cooling component(s) 120 may also include one or more heat sinks. Although examples herein may describe the cooling component(s) 120 as component(s) or sub-component(s) of the rack(s) 104, embodiments are not so limited. In some embodiments, one or more cooling component(s) 120 may be physically separate from the rack(s) 104 and arranged to cool at least a portion of the rack(s) 104. The cooling component(s) 120 may be adjustable to operate at different settings such as different fan speeds, blower speeds, compressor settings, pressure settings, and so forth. The speed or other operations of the cooling component(s) 120 may be adjusted via control signals(s) sent from control device(s).

A data storage module 106 may include any number of temperature sensor(s) 112 configured to measure the temperature of one or more components of the rack(s) 104 or the data storage module(s) 106. The temperature sensor(s) 112 may be arranged in any position or orientation within the data storage module(s) 106. Temperature sensor(s) may also be component(s) of the rack(s) 104 separate from the data storage module(s) 106. In some embodiments, one or more temperature sensor(s) may be placed in the data center 102 to measure an ambient temperature of the air or other environment in the data center 102. The temperature sensor(s) 112 may generate temperature information 126 describing the temperature of rack(s) 104, backplane(s) 108, mass storage device(s) 110, or other component(s) of the data center(s) 102. In some embodiments, the temperature sensor(s) 112 may include one or more thermocouples.

In some embodiments, the data storage module(s) 106 may also include any number of power sensor(s) 114 that measure an amount of power consumed by the mass storage device(s) 110 or other power-consuming components of the data storage module(s) 106. The power sensor(s) 114 may generate power consumption information 128 describing the power consumption of rack(s) 104, backplane(s) 108, mass storage device(s) 110, or other component(s) of the data center(s) 102.

One or both of the temperature information 126 or the power consumption information 128 may be communicated, as status information 124, to one or more control devices 122 included in the rack(s) 104. The control device(s) 122 may include any type of computing device configured to execute instructions. In some embodiments, a control device 122 may include one or more instances of firmware, such as a Basic Input/Output System (BIOS). The control device 122 may also include memory that stores any number and type of operating system (OS), applications, libraries, interfaces, or other executable software. The control device(s) 122 may execute firmware or other software that analyzes the status information 124 and emits control signal(s) to one or both of the PDU(s) 116 or the cooling component(s) 120. The control signal(s) may be communicated over one or more control signal lines 134 that communicatively couple the control device(s) 122 to one or both of the PDU(s) 116 or the cooling component(s) 120.

The control signal(s) may instruct the PDU(s) 116 or the cooling component(s) 120 to perform one or more actions based on a determined current temperature of component(s) of the rack(s) 104. For example, the temperature information 126 may indicate that a thermal event is occurring in the rack 104, such as a temperature increase in a backplane 108 of a data storage module 106. In response to the detected thermal event, the control device(s) 122 may emit control signal(s) that instruct the PDU(s) 116 to discontinue supplying power to one or more mass storage device(s) 110 coupled to the backplane 108 that is exhibiting the temperature increase. In some cases, the control signal(s) may instruct the PDU(s) 116 to discontinue supplying power to all the mass storage device(s) 110 that are coupled to the backplane 108, e.g., discontinue power to the backplane 108 as a whole. The control signal(s) may also instruct one or more cooling components 120 to alter their operation (e.g., increase fan speed) to cool the mass storage device(s) 110 or backplane 108 that is exhibiting the temperature increase.

In some cases, the control device(s) 122 may send control signal(s) to discontinue power to, or otherwise shut down, a first component group that includes one or more mass storage devices 110, backplanes 108, or data storage modules 106. The control device(s) 122 may selectively cause the shutdown of a first component group while a second component group remains operational. For example, a determination may be made that the current temperature of at least one component of the first component group exceeds a threshold temperature, and that the current temperature of at least one component of the second component group does not exceed the threshold temperature. The control signal(s) may be sent to instruct the PDU(s) 116 to selectively cause the shutdown of the first component group but not the second component group. Moreover, the control signal(s) may be sent to alter the operation of particular cooling component(s) 120 that are arranged to cool the first component group, but not alter the operation of other cooling component(s) 120. Accordingly, at least some embodiments may provide for a selective response to thermal events that enables mitigation actions directed to selected components.

In some embodiments, a component group may be shut down independently of other component(s), such that the other component(s) continue to operate as before while the component(s) of the component group are not operating or otherwise affected by the action(s).

In some embodiments, the power consumption information 128 may be employed to infer or otherwise determine a current temperature of the mass storage device(s) 110 or other component(s) of the rack(s) 104. For example, a higher power consumption of a mass storage device 110 may lead to an inference of a higher current temperature of the mass storage device 110. In some cases where direct temperature measurements of a component are not available, such as where a temperature sensor 112 is not situated to measure the temperature of the component, the control device(s) 122 may detect thermal event(s) using the temperature that is determined based on the power consumption information 128. In some cases, the determined temperature may be employed in addition to the measured temperature information 126 to detect thermal event(s). The current temperature of a component may be determined based on a predetermined relationship between the electrical power consumption and the operating temperature of a component, where the predetermined relationship is based on a previously performed calibration.

In some embodiments, the status information 124 may be communicated via one or more network(s) 132 to one or more external control device(s) 130. The external control device(s) 130 may be in a physically separate location from the data center(s) 102, and may receive the status information 124 over a wide area network (WAN) such as the Internet. The external control device(s) 130 may analyze the status information 124 and, in response to detecting a thermal event, generate one or more control signal(s). The control signal(s) may be transmitted over control signal line(s) 134 to cause action(s) to be performed by one or both of the PDU(s) 116 or the cooling component(s) 120. The operations of control device(s), such as the control device(s) 122 or the external control device(s) 130, are described further with reference to FIGS. 5-9.

In some embodiments, a rack 104 includes various network communication components, including one or more network switching devices, one or more console switching devices, communications cables such as the control signal line(s) 134, and so forth. For example, the control device(s) 122 may be communicatively coupled to the data storage module(s) 106, or sub-components thereof, by a communications link. A link may include one or more cables, and may provide a connection for data input/output (I/O) between the control device(s) 122 and the data storage module(s) 106. In some embodiments, a link may provide for data I/O on multiple channels (e.g., four channels). Each of the data storage module(s) 106 may be assigned a separate identifier. In some embodiments, a link may include a side-band connection which enables side-band communication between the control device(s) 122 and the mass storage device(s) 110 of a data storage module 106.

Although FIG. 1 depicts the temperature sensor(s) 112 and the power sensor(s) 114 as components of the data storage module(s) 106, in some embodiments one or both of the temperature sensor(s) 112 or the power sensor(s) 114 may be components of the backplane(s) 108 or the mass storage device(s) 110. For example, a temperature sensor 112 may be coupled to, or in proximity to, a backplane 108 to measure its temperature. As another example, a temperature sensor 112 may be a component of, or in proximity to, a mass storage device 110 to measure its temperature. In some cases, one or more mass storage device(s) 110 may include, as a sub-component, a power sensor 114 to measure the power consumption of the mass storage device 110.

Figure 2:
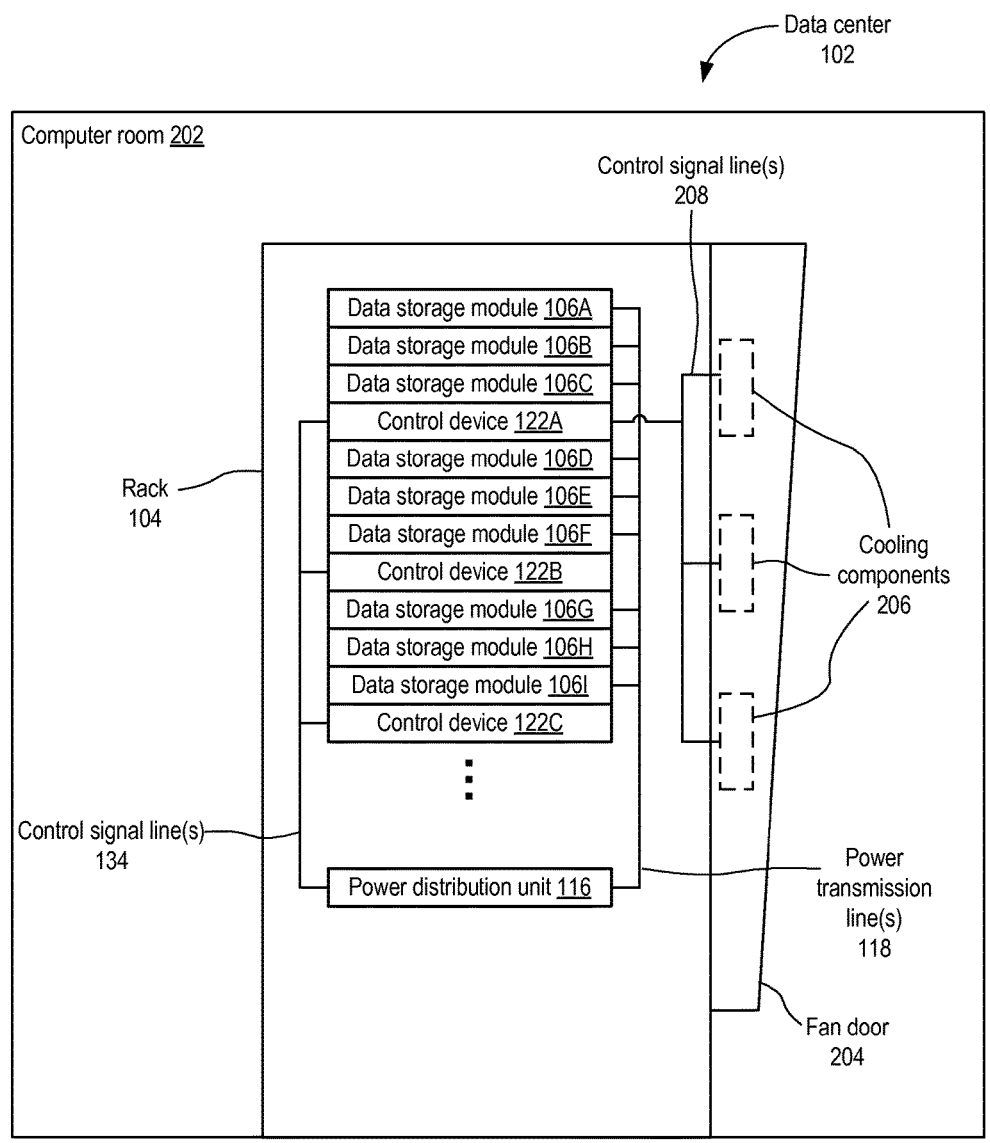
FIG. 2 is a schematic diagram illustrating an example rack computer system including one or more data storage modules housing one or more mass storage devices.

FIG. 2 illustrates an example of a data center 102, including a computer room 202 housing at least one rack 104. A data center 102 may include any number of computer rooms 202 that each house any number or racks 104. As shown in the example of FIG. 2, a rack 104 may include any number of components mounted to the rack 104. Such components may include one or more data storage modules 106, control modules 122, and PDUs 116. In some embodiments, each of data storage modules 106 may be 4 U in height and each of the data control modules 122 may be 1 U in height. Three data storage modules 106 may be communicatively coupled to, and controlled by, a control module 122, to constitute a sub-system that is 13 U in height. Three such sub-systems may consume a total of 39 U of height in the interior of the rack 104. Embodiments are not limited to this example however. In various embodiments, the data storage modules 106 and the control device(s) 122 may be any suitable height. A rack 104 may house any number of data storage module(s) 106 and any number of control device(s) 122. In various embodiments, a sub-system may comprise any ratio of control device(s) 122 to data storage module(s) 106. For example, a data storage sub-system may include one control device 122 for each data storage module 106.

As shown in the example of FIG. 2, in some embodiments a rack 104 may include a fan door 204 that houses any number of cooling components 206 such as fans, blowers, or other air moving components. The computer room 202 may include a sub-floor plenum (not shown) to allow air to flow into the computer room 202 via one or more vents. The cooling component(s) 206 (e.g., rear fans) in the fan door 204 may draw air from a front aisle into the rack 104 on a front, or inlet, side of the rack, and through or between the data storage modules 106 and the control devices 122. The cooling component(s) 206 may exhaust heated air (e.g., carrying waste heat) out of the rack 104 into an exhaust aisle on a rear, or exhaust, side of the rack 104. The heated air may then flow into a ceiling plenum of the computer room 202 (not shown). The cooling component(s) 206 may induce airflow by generating a pressure gradient across an interior of the rack 104. The cooling component(s) 206 may include air moving devices of any type or configuration, including but not limited to fans, blowers, and so forth. A blower may exhaust air with a changed direction and pressure relative to the air received into the blower. A fan may exhaust air with a substantially similar direction relative to the air received into the fan.

The control device(s) 122 may be communicatively coupled to the cooling component(s) 206 via one or more control signal line(s) 208, enabling the control device(s) 122 to emit control signal(s) to control the operations of the cooling component(s) 206. Such control signal(s) may cause the cooling component(s) 206 to turn on or off, or change a fan speed. The control device(s) 122 may also be communicatively coupled to the PDU(s) 116 via one or more control signal line(s) 134. As described with reference to FIG. 1, the control device(s) 122 may employ the control signal line(s) 134 to send control signal(s) that instruct the PDU(s) 116 to discontinue, or resume, power distribution to one or more data storage modules 106 or sub-components thereof (e.g., backplane(s) 108 or mass storage device(s) 110).

In some cases, one or more components of the rack 104 may generate more heat than other components. For example, a particular data storage module 106 may, during a particular time period, have a higher temperature than other data storage modules 106 or a temperature that is above a threshold temperature. Such a state may be characterized as a thermal event by the control device(s) 122. In such cases, the control device(s) 122 may send a control signal to a particular cooling component 206 that is arranged to move air in proximity to the data storage module 106 that is exhibiting the thermal event. The control signal may instruct the cooling component 206 to increase its fan or blower speed, or otherwise alter its operation to cool the hotter-than-threshold data storage module 106.

Figure 3:
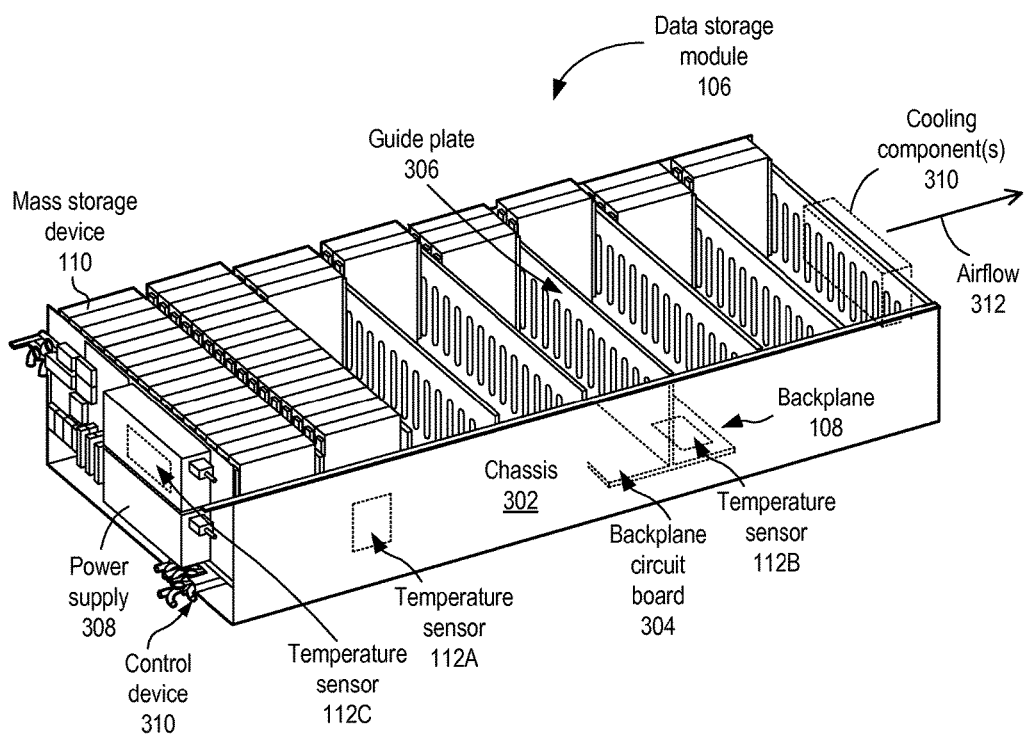
FIG. 3 is a schematic diagram illustrating an example data storage module including one or more mass storage devices for storing data.

FIG. 3 illustrates an example of a data storage module 106 that may be mounted within the interior space of a rack 104. As shown in FIG. 3, the data storage module 106 may comprise a chassis 302 that at least partly encompasses the interior space (e.g., the chassis interior) of the data storage module 106. One or more backplanes 108 may be mounted to the chassis 302. Each backplane 108 may include a backplane circuit board 304, and a guide plate 306. Any number of mass storage devices 110 may be physically coupled to the backplane 108. The mass storage device(s) 110 may be electronically and communicatively coupled to the backplane circuit board 304, enabling the mass storage device(s) 110 to receive power transmissions and communication signals sent from other components. In some embodiments, the data storage module 106 may include a power supply 308 that receives electrical power from the PDU(s) 116 and provides the power to the mass storage device(s) 110 via the backplane circuit board 304 or other power links. The power supply 308 may also supply power to other components of the data storage module 106. A data storage module 106 may include any number of power supplies 308.

In some embodiments, the control device 122 may be mounted within the rack 104 as shown in FIG. 2, as a separate component of the rack 104 relative to the data storage module(s) 106. Alternatively, one or more control devices 310 may be sub-component(s) of a data storage module 106, as shown in the example of FIG. 3.

In some embodiments, mass storage devices 110 may be installed on multiple backplanes 108 that are coupled to the chassis 302 of a data storage module 106. In the example of FIG. 3, four backplanes 108 are coupled to the chassis 302, at least two mass storage devices 110 are installed on each backplane 108, and 32 mass storage devices 110 are installed on one of the backplanes 108 that is proximate to the front of the data storage module 106. In some embodiments, as in the example of FIG. 3, a backplane 108 includes one or more horizontally-oriented backplane circuit boards 304 and one or more vertically-oriented guide plates 306 configured to guide a mass storage device 110 to align with one or more connectors on the backplane circuit board 304. The guide plate 306 may also provide structural support and stabilization of the one or more mass storage devices 110 installed on a backplane 108. In some embodiments, up to 32 mass storage devices 110 may be installed on each of the four backplanes 108, enabling up to 128 mass storage devices 110 to be installed in a data storage module 106.

In some embodiments a backplane 108 may include two or more separate backplane circuit boards 304. The backplane circuit boards 304 may be separated by one or more vertically-oriented guide plates 306, where each separate face of a guide plate 306 guides one or more mass storage devices 110 mounted on a separate one of the two or more backplane circuit boards 304. In some embodiments, one or more of the backplanes 108 may include a single backplane circuit board 304 on which a single row of mass storage devices 110 may be mounted. In some embodiments, a data storage module 108 may include backplanes 108 having different numbers of backplane circuit boards 304. For example, some backplanes 108 may include two backplane circuit boards 304 on separate sides of a guide plate 306, and some other backplanes 108 may include a single backplane circuit board 304. In some embodiments, one or more of the backplanes 108 may be arranged in a non-staggered configuration such that the horizontal portions of the backplanes 108 are substantially co-planar. In some embodiments, one or more of the backplanes 108 may be arranged in a staggered configuration to facilitate airflow. In some embodiments, a backplane 108 may include one or more backplane circuit boards 304 that are horizontally-oriented, as shown in the example of FIG. 3. In some embodiments, a backplane 108 may include one or more backplane circuit boards 304 that are vertically-oriented. In some embodiments, each of mass storage devices 110 is a hard disk drive (HDD). The data storage system 100 or at least a portion of the data storage system 100, such as a data storage module 106, may be described as a JBOD (e.g., "just a bunch of disks"). In some embodiments, one or more of the mass storage devices 110 is a 4 terabyte (TB) HDD with a Serial Advance Technology Attachment (SATA) interface. The backplane circuit board(s) 304 may include one or more power buses configured to transmit power to components, such as mass storage device(s) 110, on the backplane 108. The backplane circuit board(s) 304 may also include one or more data buses configured to transmit data to components, such as mass storage device(s) 110, on the backplane 108.

As shown in the example of FIG. 3, the data storage module 106 may also include one or more temperature sensors 112. In the illustrated example, the data storage module 106 includes at least one temperature sensor 112A that is coupled to and in thermal contact with the chassis 302, to measure a temperature of the chassis 302. The data storage module 106 also includes at least one temperature sensor 112B that is coupled to and in thermal contact with the backplane 108, to measure a temperature of the backplane 108. Other temperature sensors 112 may be coupled to other components of the data storage module 106 such as the power supply 308, the control device 310, or the mass storage device(s) 110. In some embodiments, a temperature sensor 112 may be included as a sub-component of one or more mass storage devices 110, and configured to measure the temperature of the mass storage device(s) 110. In some cases, a temperature sensor 112 may be arranged to measure the temperature of a portion of the data storage module 106 with which it is in physical, thermal contact. Alternatively, a temperature sensor 112 may be situated in proximity to a portion of the data storage module 106 to measure the ambient temperature of the nearby air or other environment. The temperature sensors 112 may be of any type, and may employ any technique for measuring temperature.

In some embodiments, the data storage module 106 may include one or more cooling component(s) 310, such as fan(s), blower(s), air compressor(s), and so forth, that are arranged to cool at least a portion of the data storage module 106. As shown in the example of FIG. 3, the cooling component(s) 310 may be arranged within the data storage module 106 to cause an airflow 312 through the data storage module 106 or across other component(s) of the data storage module 106 such as the mass storage device(s) 110. In some embodiments, the temperature of one or more mass storage devices 110 may be calculated based at least partly on a previously calibrated relationship among one or more of: a temperature measured at one or more locations in the data storage module 106; a position of the mass storage device(s) 110 relative to the location(s) where the temperature was measured; or a power consumption of the mass storage device(s) 110. Such a calibration may characterize the thermal response of a data storage module 106, and of the component(s) in the data storage module 106, to changes in temperature, airflow, and component power consumption.

For example, a calibration may be performed to characterize thermal resistance in a data storage module 106 as a function of airflow, which may be determined by a fan speed of the cooling component(s) 310. Such a characterization may be governed by Example Formula 1 below.

$$T = T_{sa} + (R\_HDD(f(\text{airflow}))) \times \text{Power} + DT_{rise\_upstream} \times P_{upstream} / P_{upstream\_characterized})$$ Example Formula 1

In Example Formula 1, T indicates a current temperature of at least a portion of a mass storage device 110 (e.g., HDD) to be calculated. T may be the temperature of the case of the mass storage device 110, or any other portion of the mass storage device 110. $T_{sa}$ is the system ambient temperature of the data storage module 106 as measured by one or more temperature sensors 112. For example, $T_{sa}$ may be the ambient temperature as measured by a temperature sensor 112C that is located upstream from the cooling component 310, such as in proximity to or in thermal contact with the power supply 308 or the control device 310. $T_{sa}$ may also be measured elsewhere in the data storage module 106, such as at or in proximity to a backplane 108, a mass storage device 110, or other component(s).

In Example Formula 1, R_HDD indicates a thermal resistance of a mass storage device 110, expressed as degrees per power unit. For example, the thermal resistance of a particular mass storage device 110 (e.g., HDD) may be expressed in units of degrees Celsius per Watt. R_HDD may be a function of airflow in proximity to the mass storage device 110, as shown in Example Formula 1. Accordingly, the relationship between power consumption of a mass storage device 110 and its temperature may vary based on the amount of air moving in proximity to the mass storage device 110. R_HDD may have been previously calibrated for the mass storage device 110, either in the context of the data storage module 106 or in a standalone context. In some cases, a manufacturer of the mass storage device 110 may provide information regarding R_HDD. In some cases, R_HDD may be uniquely calibrated for each mass storage device 110 based on its position within the data storage module 106, and based on the particular technical specifications, model, or other characteristics of the mass storage device 110. In Example Formula 1, Power is the power currently being consumed by the mass storage device 110. Power may be determined based on the power consumption information 128.

In Example Formula 1, $DT_{rise\_upstream}$ may indicate the temperature increase within the data storage module 106 as a function of airflow and power consumed. This factor may take into account the effect of other (e.g., upstream) mass storage device(s) 110 on the temperature of the particular mass storage device 110 for which T is being calculated. $P_{upstream}$ is the amount of power being currently consumed by the other (e.g., upstream) mass storage device(s) 110, as indicated by the power consumption information 128. $P_{upstream\_characterized}$ may be a factor, determined through previous calibration, indicating how $P_{upstream}$ may vary for different power levels. For example, previous calibration may have measured the effect on the temperature of an upstream mass storage device 110 operating at a first power level and at a second power level, and $P_{upstream\_characterized}$ may describe an extrapolation of $P_{upstream}$ to other values to enable a determination of $P_{upstream}$ anywhere in a range of power levels from the first power level to the second power level. $P_{upstream\_characterized}$ may be described as a weighting factor that is used to adjust $P_{upstream}$ at various power levels. Various embodiments also support the use of other algorithms to estimate, calculate, or otherwise determine the temperature at a particular mass storage device 110 as a function of ambient temperature, power consumption, position, airflow, or other variables.

Figure 4:
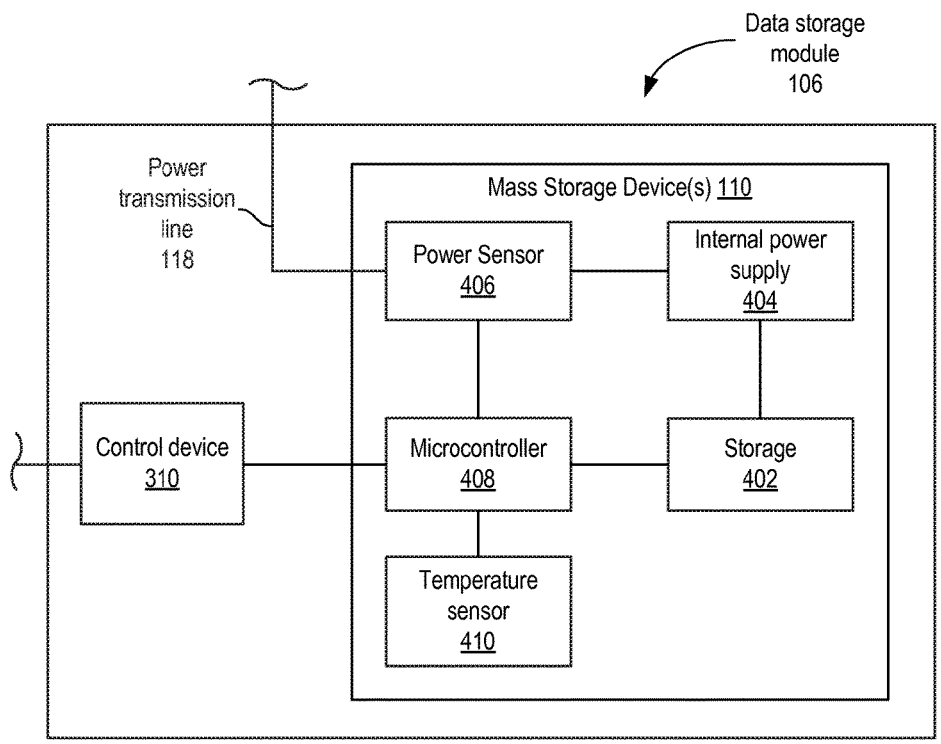
FIG. 4 is a schematic diagram illustrating an example data storage module including one or more mass storage devices and a control module for controlling operations of the data storage module.

FIG. 4 illustrates an example of a data storage module 106 that includes one or more mass storage devices 110 and a control device 310. As illustrated, the mass storage device(s) 110 may include storage 402. The storage 402 may be configured to store any amount and type of data, and may employ any storage format or storage technology. An internal power supply 404 may supply power to the storage 404 and other components of the mass storage device(s) 110. In some embodiments, the mass storage device(s) 406 may include a power sensor that measures the amount of power that is consumed by the mass storage device(s) 110 during operation. The power may be received at the mass storage device(s) 110 over the power transmission line(s) 118 from the PDU(s) 116.

A microcontroller 408 may be communicatively coupled to the storage 402, and may be configured to perform various operations to manage the storage of data on the storage 402, such as data access operations to read, write, update, or delete data on the storage 402. The microcontroller 408 may be communicatively coupled to the power sensor 406. The microcontroller 408 may receive power consumption information 128 from the power sensor 406, and provide the power consumption information 128 to the control device 310. The power sensor 406 may be electrically coupled to the power transmission line 118 which supplies electrical power to the mass storage device 110. As shown in the example of FIG. 4, the power sensor 406 may be an internal sensor included as a sub-component of the mass storage device 110. Alternatively, the power sensor 406 may be external to the mass storage device 110. The power sensor 406 may be coupled to an internal power transmission line that transmits power to the internal power supply 404. In some embodiments, the power sensor 406 may include a sensing element such as one or more of a resistor, a point of load device, and so forth. In some embodiments, a sensing element may include a point of load D-to-D device. The microcontroller 408 may be configured to determine the amount of electrical power supplied to the internal power supply 404, and consumed by the mass storage device 110, based on an amount of current through a parallel circuit to which the microcontroller 108 is coupled and based on predetermined characteristics (e.g., resistance or impedance) of the sensing element.

In some embodiments, a power sensor 406 may generate power consumption information 128 indicating electrical power consumption by a corresponding mass storage device 110. The power sensor 406 may include a sensing element, such as an electrical resistor characterized by a predetermined electrical resistance. The sensor 406 may also include an ammeter to measure current. A portion of the power supplied to the mass storage device 110 may be redirected through the power sensor 406 which measures a current strength using the ammeter. The power sensor 406 may communicate the measured current strength to the microcontroller 408. The microcontroller 408 may then calculate, based on the measured current strength and the predetermined electrical resistance of resistor, the amount of electrical power being consumed by the mass storage device 110. The power consumption information 128 may then be provided to a control device.

In some embodiments, the mass storage device(s) 110 may include a temperature sensor 410 configured to measure the temperature of the mass storage device(s) 110. The microcontroller 408 may be communicatively coupled to the temperature sensor 410. The microcontroller 408 may receive temperature information 126 from the temperature sensor 410 and provide the temperature information 126 to a control device. The temperature sensor 410 may be of any type, and may employ any technique to measure the temperature of the mass storage device 110.

In some embodiments, the microcontroller 408 may perform operations to process one or both of the power consumption information 128 or the temperature information 126 generated respectively by the power sensor 406 or the temperature sensor 410. Such processing may include converting the generated data into a format that is readable by one or more software programs, or generating metadata to describe the power consumption information 128 or the temperature information 126. The metadata may include one or more of the following: a timestamp indicating a time at which the data was generated; an identifier of the mass storage device 110; or other information.

The microcontroller 408 may provide status information 124, including one or both of the temperature information 126 or the power consumption information 128, to one or more control devices that are external to the mass storage device 110. In the example of FIGS. 3 and 4, a control device 310 is included as a subcomponent of a data storage module 106. Alternatively, as shown in FIGS. 1 and 2, a control device 122 is a component of a rack 104, mounted in the rack 104 separately from the data storage module(s) 106. A control device may also be external to the rack(s), such as external control device(s) 130. In some embodiments, a control device may include one or more instances of an intelligent platform management interface (IPMI), including one or more instances of a baseboard management controller (BMC). In some embodiments, a control device may include a BMC and firmware that are communicatively coupled to the microcontroller 408 via one or more communication links.

In some embodiments, the microcontroller 408 transmits internally generated power consumption information 128 and temperature information 126 to one or more control devices such as the control device 310, control device 122, or external control device 130. In some cases, at least some of the internally generated data may be transmitted to a control device via a side-band communication link between the mass storage device 110 and the control device. In such cases, the mass storage device 110 may include a communication interface configured to communicate data to a control device via a side-band communication link. In some embodiments, side-band communication between a microcontroller 408 and a control device may include communication via an I²C interface or other interface. By employing side-band communication to transmit power consumption information 128 or temperature information 126, a microcontroller 408 may leave in-band communication links available for other purposes, such as data migration to and from a mass storage device 110 or other data access operations.

Alternatively, the internally generated power consumption information 128 and temperature information 126 may be transmitted to a control device via an in-band communication link between the mass storage device 110 and the control device, where such in-band communication may be mediated by an OS or by firmware. The microcontroller 408 may be configured to transmit at least some internally generated information via in-band communication. In some embodiments, in-band communication from the microcontroller 408 may include communication over one or more in-band communication interfaces, including one or more of a Peripheral Component Interconnect (PCI) Express™ interface, a SATA interface, a Serial Attached SCSI (SAS) interface, some combination thereof, or the like.

Although FIG. 4 depicts the power sensor 406 as a component of the mass storage device(s) 110, embodiments are not so limited. In some embodiments, one or more power sensors may be components of the data storage module 106 or the PDU 116. In such cases, power sensors may be coupled to separate power transmission lines 118 that supply power to individual mass storage devices 110. Each power sensor may measure the power consumed by a different mass storage device 110, or by a different set of mass storage devices 110 coupled to a particular backplane 108. Moreover, in some embodiments a power sensor may measure the power consumed by a data storage module 106 as a whole. In some embodiments, a power sensor may be configured to selectively monitor the power consumption of a selected set of one or more mass storage devices 110, and the power sensor may be controllable to switch between monitoring the power consumption of different sets of mass storage devices 110.

Figure 5:
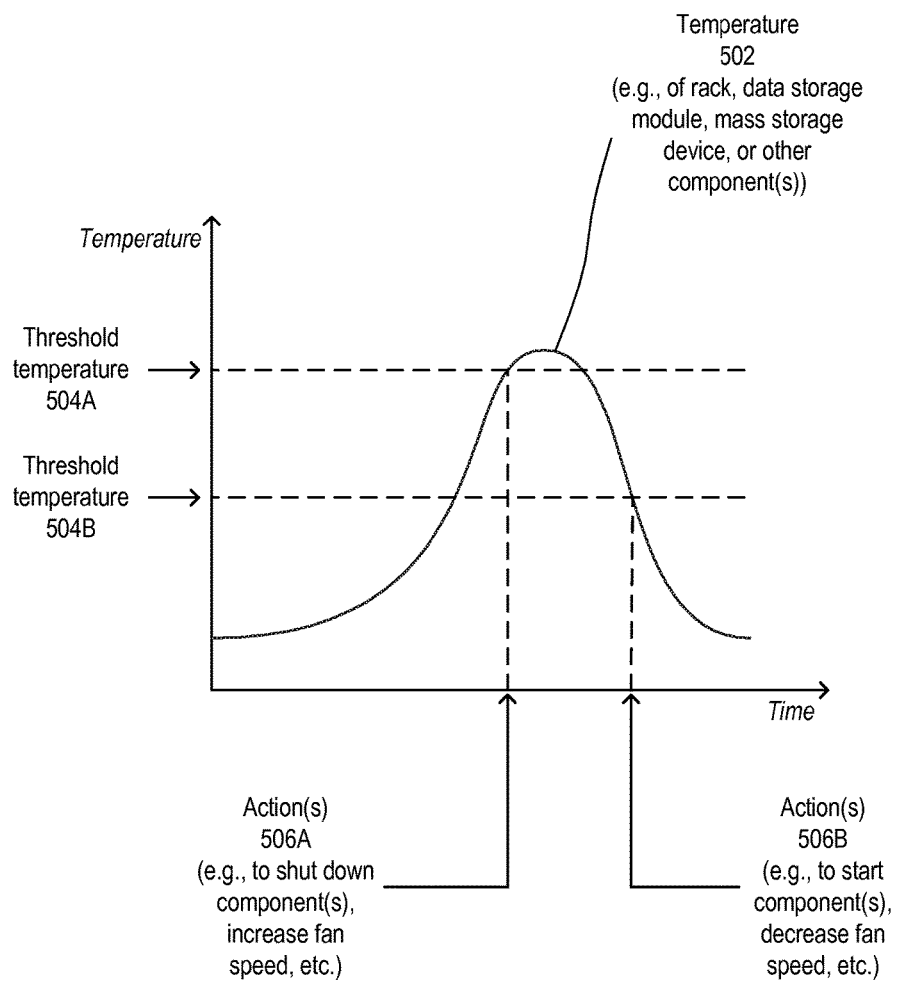
FIG. 5 is a graph illustrating an example of performing action(s) in response to a thermal event such as a temperature increase detected in one or more components, according to exemplary embodiments.

FIG. 5 is a graph illustrating an example of performing action(s) in response to a thermal event such as a temperature increase detected in one or more components of a data storage system 100, according to exemplary embodiments. As described above, a temperature 502 (e.g., a current temperature) may be determined for one or more components of a data storage system 100, including but not limited to one or more of: a rack 104, a data storage module 106, a backplane 108 (e.g., a set of mass storage devices 110 coupled to a backplane 108), or a mass storage device 110. In some cases, a temperature 502 may be determined for other components such as the power supply 308 or the control device 310. In some embodiments, the temperature 502 of component(s) may be described in the temperature information 126 generated by one or more temperature sensors arranged at various locations in the rack(s) 104 or external to the rack(s) 104. In some embodiments, the temperature 502 may be inferred or otherwise determined based on the power consumption information 128 generated by one or more power sensors. The temperature 502 may be measured dynamically during operations of the data storage system 100, such that the temperature 502 reflects a current temperature of component(s).

As shown in FIG. 5, the temperature 502 for one or more components may be monitored over a period of time. The temperature 502 may be monitored for a single component such as a rack 104, a data storage module 106, a backplane 108, or a mass storage device 110. In some cases, the temperature 502 may be monitored for multiple individual components or for one or more groups of components. Based on the monitored temperature 502, a thermal event may be determined to be occurring in the data storage system 110 or in one or more components of the data storage system 110. In some embodiments, a thermal event may be characterized by the temperature 502 exceeding a predetermined threshold temperature 504A for one or more components. In some embodiments, a thermal event may be characterized by the temperature 502 exhibiting a rate of change that is greater than a predetermined threshold rate of change in the temperature. For example, the rate of change in the temperature 502 over time may be calculated, e.g., as a delta, a first derivative, or a slope of the plotted temperature 502 shown in FIG. 5. The determined rate of change may be compared to a threshold rate of change, and a thermal event may be detected if the determined rate of change exceeds (e.g., is faster than) the threshold rate of change. Various embodiments also support the use of other mathematical operations applied to the temperature 502 to characterize a thermal event, such as a second derivative or higher derivatives of the temperature 502 as a function of time, a proportion of the temperature 502 relative to another variable, or an integral of the temperature 502 as a function of time. Various embodiments may also employ other information to determine whether a thermal event is occurring, such as the operation or non-operation of cooling component(s). The identification of thermal event(s) may be performed by one or more control devices such as the control device(s) 122, the control device(s) 310, or the external control device(s) 130 based on analysis of the status information 124.

If it is determined that a thermal event is occurring, a control device may emit one or more first control signals to cause action(s) 506A that may mitigate or otherwise attempt to counter the thermal event by lowering the temperature of one or more components. For example, the first control signal(s) may be sent to the PDU(s) 116 to instruct the PDU(s) 116 to stop providing power to one or more components that are exhibiting the thermal event. As another example, the first control signal(s) may be sent to cooling component(s) to increase fan speed or otherwise alter the operations of the cooling component(s). In some cases, the cooling component(s) that receive the first control signal(s) are those cooling component(s) in proximity to the component(s) exhibiting the thermal event, or those cooling component(s) situated to move air in proximity to the component(s) exhibiting the thermal event.

After the first control signal(s) are sent to cause the action(s) 506A, the control device may continue to monitor the temperature 502. If the temperature 502 falls below a threshold temperature 504B, the control device may emit one or more second control signals to cause a second set of action(s) 506B. In some cases, the action(s) 506B may at least partly reverse the action(s) 506A. For example, the action(s) 506B may restore power to component(s) that were previously powered off by the action(s) 506A. As another example, the action(s) 506B may lower the fan speed or otherwise alter the operations of the cooling component(s) that were affected by the action(s) 506A. In some embodiments, the threshold temperature 504B may be lower than the threshold temperature 504A, to account for a possible hysteresis exhibited by the temperature change of component(s).

In some embodiments, if the temperature 502 has not fallen below the threshold temperature 504B within a certain predetermined period of time after the first action(s) 506A, the control device may emit additional control signal(s) to cause further action(s) 506A that attempt to lower the temperature. In some cases, the first action(s) 506A may be directed to a first component group of one or more components of the data storage system 100, and the second action(s) 506A may be directed to a second (e.g., larger) component group. For example, the control device may determine that a thermal event is occurring in a backplane 108, such that the measured temperature of the backplane 108 is higher than the threshold temperature 504A. Control signal(s) may be emitted to cause first action(s) 506A that shut off power to a subset of the mass storage device(s) 110 coupled to the backplane 108. If the temperature 502 does not fall below the threshold temperature 504B within a predetermined period of time, the control device may emit additional control signal(s) to cause second action(s) 506A that shut off power to a larger subset (or all) of the mass storage device(s) 110 coupled to the backplane 108. Various embodiments enable the control devices to take any number of sets of action(s) to address a thermal event.

In some embodiments, the control signal(s) may be sent to the PDU(s) 116 to instruct the PDU(s) to stop providing power to one or more components in a component group, in response to a thermal event. Alternatively, the control signal(s) may be sent to the mass storage device(s) 110. On receiving the control signal(s), the microcontroller(s) 408 of the mass storage device(s) 110 may begin a shutdown of the mass storage device(s) 110.

Various embodiments support the use of any number and value of threshold temperatures 504 to determine when control signal(s) are to be sent. In some cases, the threshold temperature(s) 504 may be predetermined based on operating specifications of the components. For example, a HDD such as a mass storage device 110 may have a maximum operating temperature of 50 degrees Celsius as indicated by the manufacturer, but the HDD may be operated (e.g., for short periods of time) at a higher temperature before non-recoverable failure. Accordingly, the threshold temperature 504A may be set at 60 degrees Celsius to shut down HDDs whose temperatures exceed 60 degrees. The threshold temperature 504B may be set lower than 60 degrees to allow the HDDs to cool somewhat before being powered on again. By operating the mass storage device(s) 110 or other components at or beyond their maximum recommended operating temperature for as long as possible, at least some embodiments may enable a greater utilization of data storage resources in a data storage system 100.

In some embodiments, the action(s) 506A may include instructing one or more mass storage devices 110 to reduce (e.g., throttle) the activity on the mass storage device(s) 110. For example, control signal(s) may be sent to the microcontroller 408 of one or more mass storage devices 110 experiencing a thermal event. In response to the control signal(s), the microcontroller(s) 408 may begin reducing the number of operations performed on their respective mass storage device(s) 110. The reduction in the number of operations may cause a reduction in the power being consumed by the mass storage device(s) 110, which may lead to a reduction of the temperature of the mass storage device(s) 110. In some cases, the microcontroller(s) 408 may begin denying data access requests made to access (e.g., read, write, update, etc.) data stored on the mass storage device(s) 110, and such access requests may instead be made to other mass storage device(s) 110. Alternatively, responsive to the control signal(s), the microcontroller(s) 408 may not execute, or may delay the execution of, other operations related to data storage, such as indexing, cache maintenance, data synchronization with other devices, cleanup of records marked for deletion, and so forth. Moreover, in some embodiments the control signal(s) may be sent to instruct other computing device(s) to avoid accessing data stored on the mass storage device(s) 110 that are experiencing a thermal event, to reduce the amount of activity on the mass storage device(s) 110 in an attempt to mitigate the thermal event. In some embodiments, the control signal(s) may be sent to control device(s) 122 that control requests being sent to one or more mass storage device(s) 110. The control signal(s) may instruct the control device(s) 122 to redirect, to other mass storage device(s) 110, at least some of the data access request(s) that would otherwise be processed by the mass storage device(s) 110 experiencing the thermal event. In some cases, reducing the level of activity on one or more mass storage devices 110 may include reducing a clock speed, processor speed, or other operational characteristics of the mass storage device(s) 110.

In some embodiments, the action(s) 506A may include reducing (e.g., throttling) the amount of power being provided to the mass storage device(s) 110 that are experiencing the thermal event. In such cases, the control signal(s) may instruct power distribution unit(s) 116 to reduce the amount of power being supplied to component(s) in a component group, but not cut off the supplied power entirely. The action(s) 506B may include restoring the previous level of activity or operations on the mass storage device(s) 110, in cases where the action(s) 506A reduced the level of activity or the number of operations. In some cases, the action(s) 506B may include restoring the power supplied to the mass storage device(s) 110 to a previous power level, in cases where the action(s) 506A reduced the amount of power being supplied to the mass storage device(s) 110.

At least some embodiments may employ different thresholds other than those shown in the example of FIG. 5. In some embodiments, when the temperature rises above a first threshold temperature 504, one or more messages or notifications may be sent to processes, devices, or users to warn them that action(s) 506A are about to be performed. Then the action(s) 506A may be performed when the temperature exceeds a second threshold temperature 504, e.g., that is higher than the first threshold temperature 504 that triggers the messages or notifications.

Figure 6:
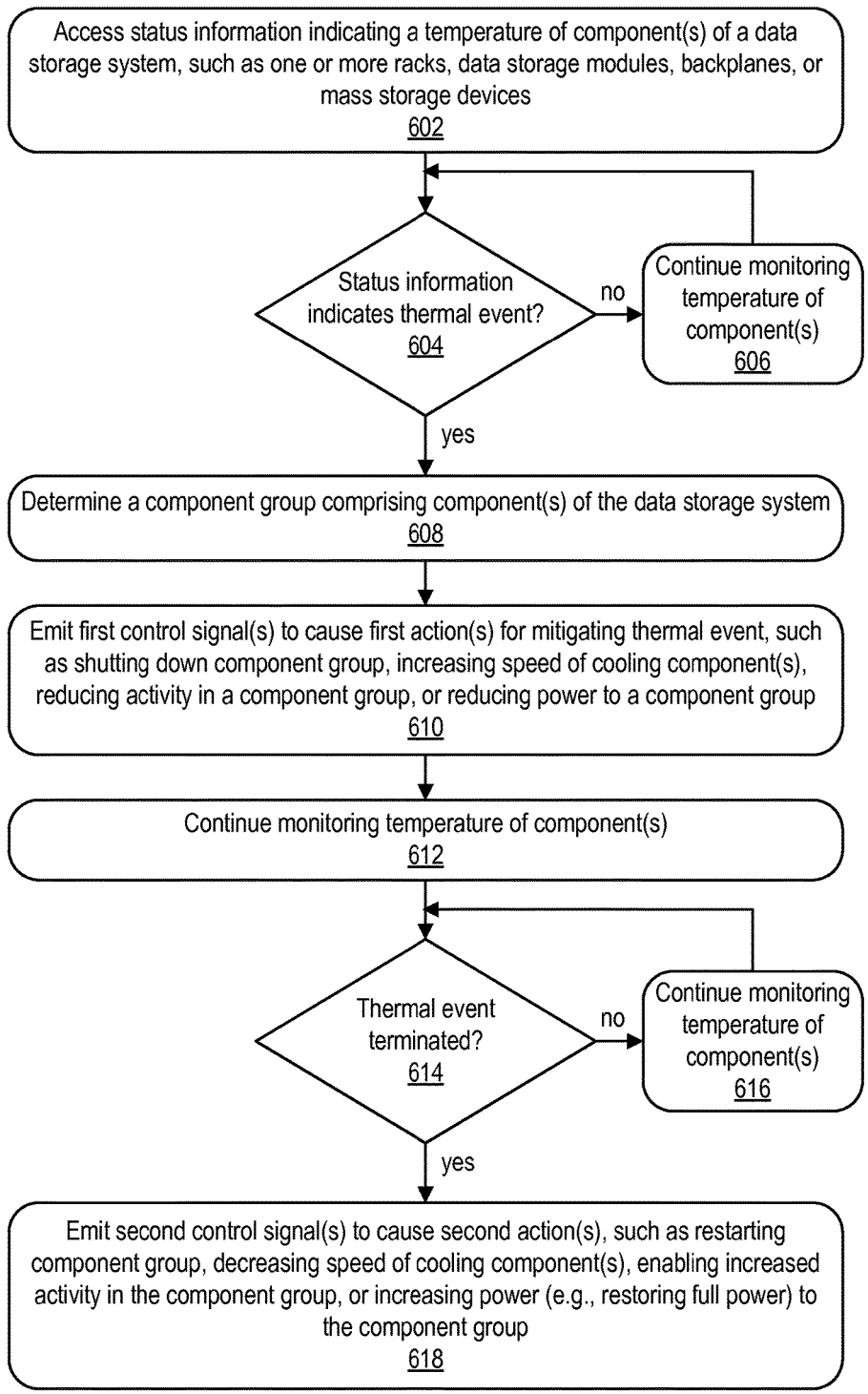
FIG. 6 is a flow diagram illustrating, according to exemplary embodiments, an example process for monitoring the temperature of one or more components, and performing action(s) in response to detected thermal events.

FIG. 6 is a flow diagram illustrating, according to exemplary embodiments, an example process for monitoring the temperature of one or more components, and performing action(s) in response to detected thermal events. Operations of the process may be performed by one or more of the control device(s) 122, the control device(s) 310, or the external control device(s) 130.

At 602, the status information 124 is accessed. As described above, the status information 124 may include one or more of the temperature information 126 or the power consumption information 128. In some embodiments, the status information 124 may indicate a temperature of one or more components of the data storage system 100, including one or more of a rack 104, a data storage module 106, a backplane 108 (e.g., the set of mass storage device(s) 110 coupled to a backplane 108), a mass storage device 110; or other components.

At 604, a determination is made whether the status information 124 indicates that a thermal event is occurring in one or more components. If not, the process may continue monitoring the temperature of component(s) at 606. If it is determined that the status information 124 indicates a thermal event, the process may proceed to 608. As described with reference to FIG. 5, a thermal event may be characterized by a temperature being higher than a predetermined threshold temperature. In some embodiments, a thermal event may be characterized by a rate of temperature change being higher than a threshold rate. A thermal event may also be characterized by other conditions, such as the failure of one or more cooling components.

At 608, a component group of one or more components is determined. In some cases, the component group may be determined to include the component(s) that are exhibiting the thermal event. In some cases, the component group may be determined to include component(s) comprising sub-component(s) that are exhibiting the thermal event. For example, if it is determined that a mass storage device 110 is exhibiting a thermal event, the component group may be determined as one or more of: the mass storage device 110; the backplane 108 coupled to the mass storage device 110, including the set of mass storage device(s) 110 coupled to the backplane 108; the data storage module 106 that includes the mass storage device 110; the rack 104 that includes the mass storage device 110; or the data center 102 that includes the mass storage device 110.

In some cases, the component group may be determined to include component(s) that are proximal to the component(s) exhibiting the thermal event. For example, if it is determined that a mass storage device 110 is exhibiting a thermal event, the component group may be determined to include the mass storage device 110 as well as other (e.g., adjacent or nearby) mass storage device(s) 110. As another example, if it is determined that a backplane 108 is exhibiting a thermal event, the component group may be determined to include the backplane 108 as well as one or more adjacent or otherwise nearby backplane(s) 108. The component group may also include other component(s) of the data storage system 100, such as control devices, PDU(s) 116, components of a power distribution system or infrastructure, network appliances, cooling components, and so forth. In some embodiments, a component group may include any number of components that are heat generating components.

At 610, one or more first control signals may be emitted to cause a first set of one or more actions to be performed for mitigating the thermal event. The control signal(s) may be sent to the component(s) of the component group, or may be sent to PDU(s) 116, cooling component(s), or other component(s) that may affect the temperature of the component(s) of the component group.

In some embodiments, the first control signal(s) may be sent to one or more PDU(s) 116 or other components of a power distribution system to cause an interruption in the power supplied to the component(s) of the component group. In such cases, the control signal(s) may identify the particular component(s) to which power is to be discontinued. The interruption of the power supply may cause one or more mass storage devices 110 to shut down, which may in turn lower the temperature of those mass storage device(s) 110 or other component(s). In some embodiments, the first control signal(s) may be sent to the microcontroller(s) 408 of one or more mass storage devices 110 to cause the microcontroller(s) 408 to initiate a (e.g., controlled) shutdown of the mass storage device(s) 110. In some embodiments, the first control signal(s) may be sent to one or more control devices that control one or more data storage modules 106, and the first control signal(s) may instruct the control device(s) to initiate a shutdown of one or more of the components (e.g., mass storage devices 110) of a data storage module 106.

In some embodiments, the first control signal(s) may be sent to cooling component(s) to increase speed (e.g., fan speed or blower speed) or otherwise alter the operations of the cooling component(s). In some cases, the cooling component(s) that receive the first control signal(s) may include cooling component(s) that are in proximity to the component(s) of the component group, or cooling component(s) situated to move air in proximity to the component(s) of the component group.

Other action(s) may also be performed in response to the first control signal(s). For example, the first control signal(s) may instruct PDU(s) 116 or other power distribution component(s) to reduce the amount of power provided to components, instead of shutting off the power distribution completely. The control signal(s) may also instruct component(s) to reduce the number of operations performed on the component(s), or reduce the amount of data stored on the component(s), to attempt to reduce the temperature of the component(s) as described further with reference to FIG. 5.

Although examples herein may describe action(s) to shut down or adjust the cooling of mass storage device(s) 110, embodiments are not so limited. In some embodiments, action(s) may be performed that are directed to other components of the data storage system 100. For example, in cases where a data storage module 106, rack 104, or other component includes two or more redundant network controllers (e.g., NICs), one of the network controllers may be shut down in response to a detected thermal event in the network controller(s) or other component(s).

At 612, the process may continue monitoring the temperature of the component(s) that exhibited the thermal event, to determine whether the thermal event persists. At 614, a determination is made whether the thermal event has terminated, based on further analysis of current status information 124. If the thermal event has not terminated, the process may proceed to 616 and continue monitoring the temperature. If the thermal event has terminated (e.g., if the temperature falls below a second threshold temperature), the process may proceed to 618.

At 618, one or more second control signals may be emitted to cause a second set of one or more actions to be performed. In some cases, the second set of action(s) may at least partly reverse the first set of action(s) caused by the first control signal(s). For example, the second set of action(s) may restore power to at least one of the component(s) that were powered off, or subjected to a reduced power, by the first set of action(s). As another example, the second set of action(s) may lower the fan speed or otherwise reverse the alterations to the operations of the cooling component(s) previously caused by the first set of action(s). In cases where the first action(s) reduced activity on the component(s), e.g., by reducing the number of operations performed by the component(s), the second action(s) may restore the activity level of component(s) to their previous state. The process may then continue monitoring the status information 124 to detect a recurrence of the same thermal event or other thermal events in the component(s) of the data storage system 100.

Figure 7:
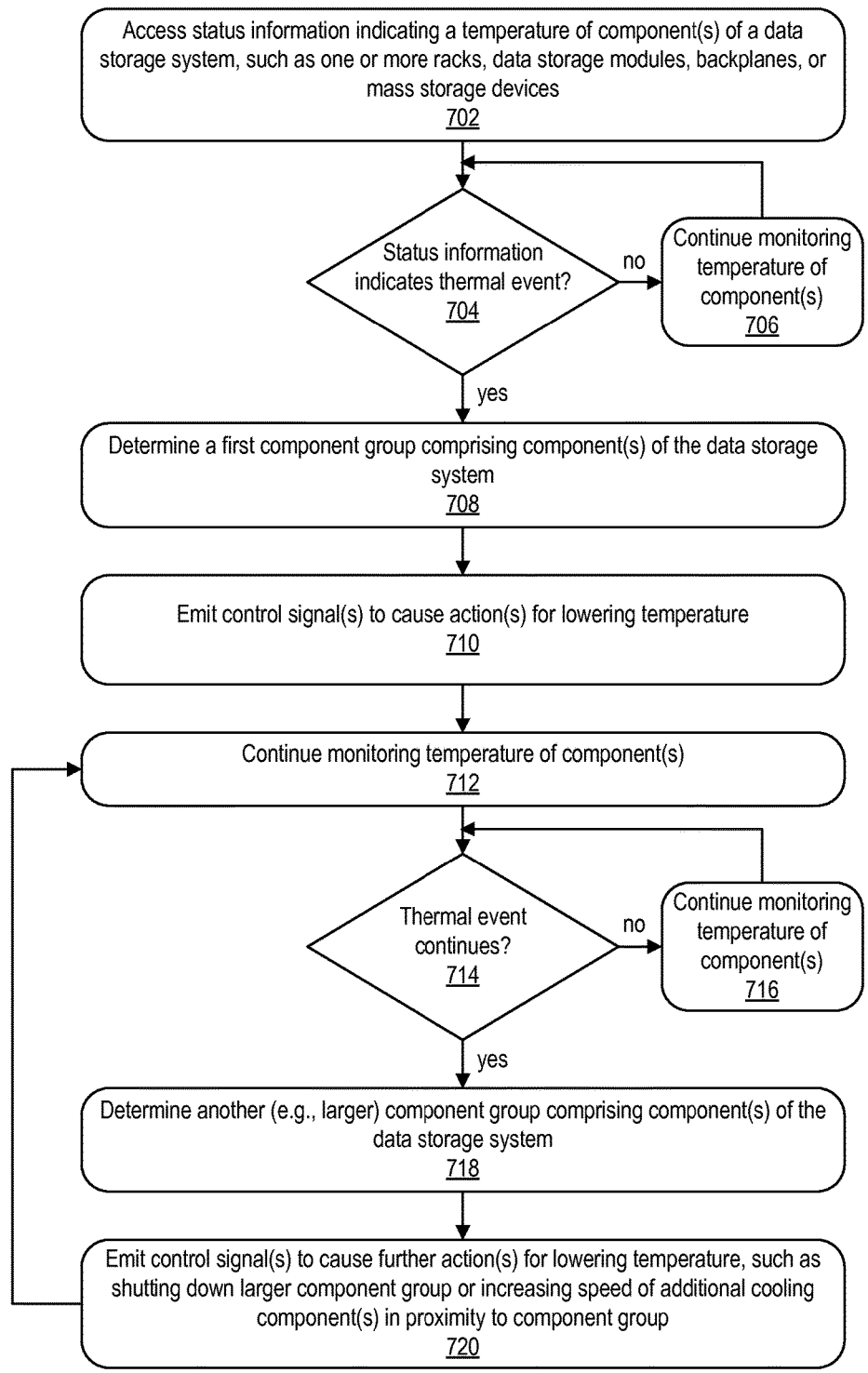
FIG. 7 is a flow diagram illustrating, according to exemplary embodiments, an example process for monitoring the temperature of one or more components, and performing action(s) in response to detected thermal events.

FIG. 7 is a flow diagram illustrating, according to exemplary embodiments, an example process for monitoring the temperature of one or more components, and performing action(s) in response to detected thermal events. Operations of the process may be performed by one or more of the control device(s) 122, the control device(s) 310, or the external control device(s) 130.

At 702, the status information 124 may be accessed. At 704, a determination is made whether the status information 124 indicates a thermal event. If not, the process may continue monitoring the temperature at 706. If so, the process may proceed to 708 and determine a first component group. At 710, control signal(s) may be emitted to cause action(s) to lower the temperature or otherwise mitigate the thermal event. The operations at 702, 704, 706, 708, and 710 may proceed as described with reference to 602, 604, 606, 608, and 610 respectively.

At 712, the process may continue monitoring the temperature of component(s) based on updated status information 124.

At 714, a determination is made whether the thermal event is continuing. Such a determination may be based on further analysis of updated status information 124 indicating that the conditions of the thermal event persist. For example, the temperature of one or more components may remain higher than a threshold temperature, or the rate of increase of the temperature may remain higher than a threshold rate.

If the thermal event is not continuing, the process may proceed to 716 and continue monitoring the temperature of the component(s). In some embodiments, as described with reference to FIG. 6, further action(s) may be performed to at least partly reverse the action(s) caused by the control signal(s) emitted at 710.

If it is determined at 714 that the thermal event continues, the process may proceed to 718. At 718, another component group of one or more component(s) may be determined. In some embodiments, the other component group may be larger than the first component group determined at 708 and may comprise a larger number of components (e.g., more mass storage device(s) 110).

At 720, additional control signal(s) may be emitted to cause further action(s) that attempt to mitigate the thermal event. In some cases, the action(s) caused by the subsequently emitted control signal(s) may be the same as the action(s) caused by the earlier control signal(s). For example, both sets of action(s) may include shutting of power to component(s), but the second set of action(s) may shut off power to a larger component group than the first set of action(s). In some cases, the action(s) caused by the subsequently emitted control signal(s) may be different than the action(s) caused by the earlier control signal(s). For example, the first set of action(s) may include shutting off power to component(s) of the component group, and the second set of action(s) may include modifying the operation (e.g., increasing fan speed) of cooling component(s) arranged to cool the same component group or a different component group.

The process may then return to 712 and continue monitoring the temperature of component(s). The process may perform another iteration if the thermal event persists. Various embodiments enable any number of sets of action(s) to be performed in response to a thermal event, targeting the same or a different component group. In some embodiments, as a last resort, an entire data storage module 106, an entire rack 104, or an entire data center 102 may be powered off in an attempt to mitigate a thermal event.

Figure 8:
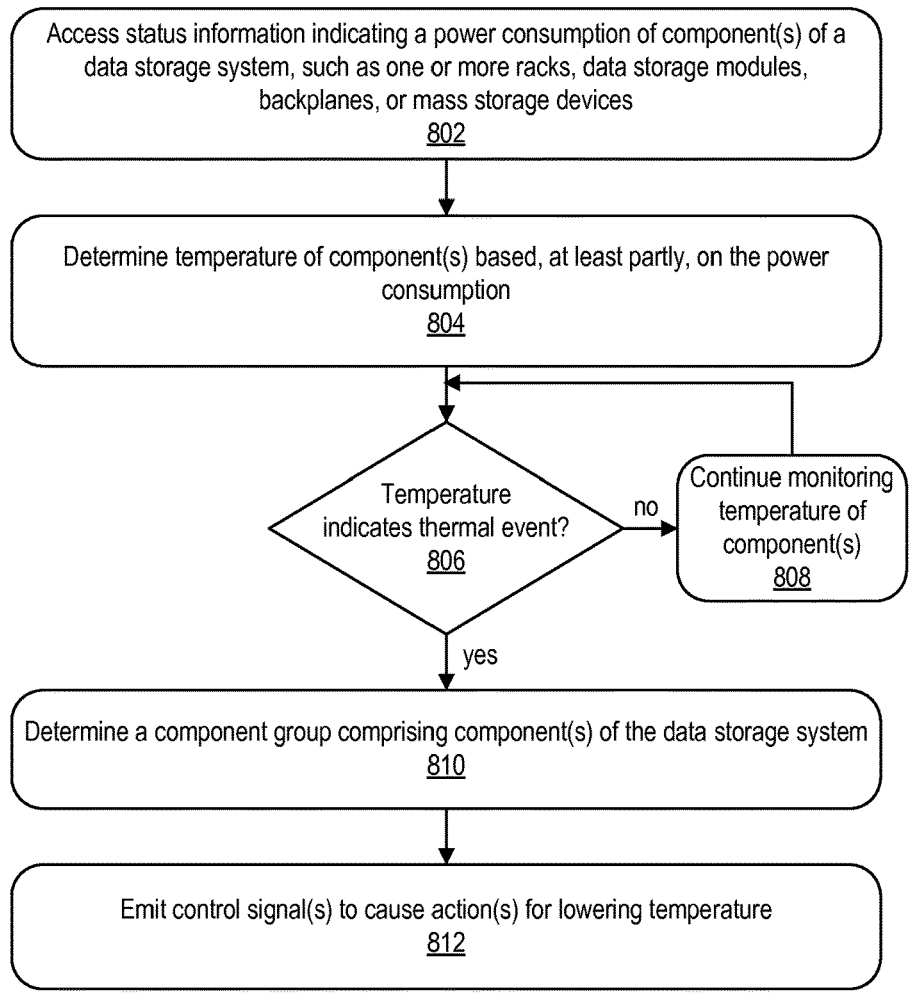
FIG. 8 is a flow diagram illustrating, according to exemplary embodiments, an example process for determining the temperature of one or more components based on power consumption information, and performing action(s) in response to detected thermal events.

FIG. 8 is a flow diagram illustrating, according to exemplary embodiments, an example process for determining the temperature of one or more components based on power consumption information, and performing action(s) in response to detected thermal events. Operations of the process may be performed by one or more of the control device(s) 122, the control device(s) 310, or the external control device(s) 130.

At 802, the status information 124 is accessed as described with reference to 602.

At 804, the temperature of each of one or more components may be inferred or otherwise determined based at least partly on the power consumption of the component described in the power consumption information 128. In some embodiments, an operating temperature of one or more mass storage devices 110 may be determined based at least in part upon the determined electrical power consumption by the one or more mass storage devices 110. A relationship between electrical power consumption and operating temperature may be determined for one or more mass storage devices 110, based at least in part on tracking variations over time in electrical power consumption and operating temperature of at least one example set of mass storage devices 110. In some cases, the relationship may be associated with various mass storage devices 110 determined to have one or more similar properties, including a common manufacturer, model, quantity, etc. relative to an example set of mass storage devices. As a result, based at least in part upon the determined relationship associated with a given set of mass storage devices 110, an operating temperature of particular mass storage device(s) 110 may be determined based on the power consumption information 128 generated by power sensor(s) 406. In some embodiments, the temperature may be estimated for one or more component(s) using the Example Formula 1 described above, or using some other algorithm that enabling estimation of temperature based on airflow, ambient temperature, power consumption, position, or other variables. In some cases, small power fluctuations (e.g., within a range of 1-2 Watts) may lead to smaller variations in the temperature of component(s). Accordingly, in some embodiments, power consumption information may be employed to determine temperature in cases where large fluctuations in power are observed, e.g., large fluctuations that are outside a power consumption range that characterizes typical or normal activity of component(s).

At 806, a determination is made whether a thermal event is occurring. If not, the process may proceed to 808 and continue monitoring the temperature of component(s) based on their power consumption or measured temperature. If so, the process may proceed to 810 and determine a component group. At 812, one or more control signals may be emitted to cause action(s) to mitigate the thermal event. The operations at 806, 808, 810, and 812 may proceed as described with reference to 604, 606, 608, and 610 respectively.

The power consumption information 128 may be employed to infer or otherwise determine the operating temperature of component(s) in some embodiments where direct temperature measurements are not available, such as some embodiments where temperature sensor(s) are not present to measure the temperature of at least some components. In some embodiments, the power consumption information 128 may be employed to refine or otherwise modify the temperature(s) determined based on measurements of temperature sensor(s).

Figure 9:
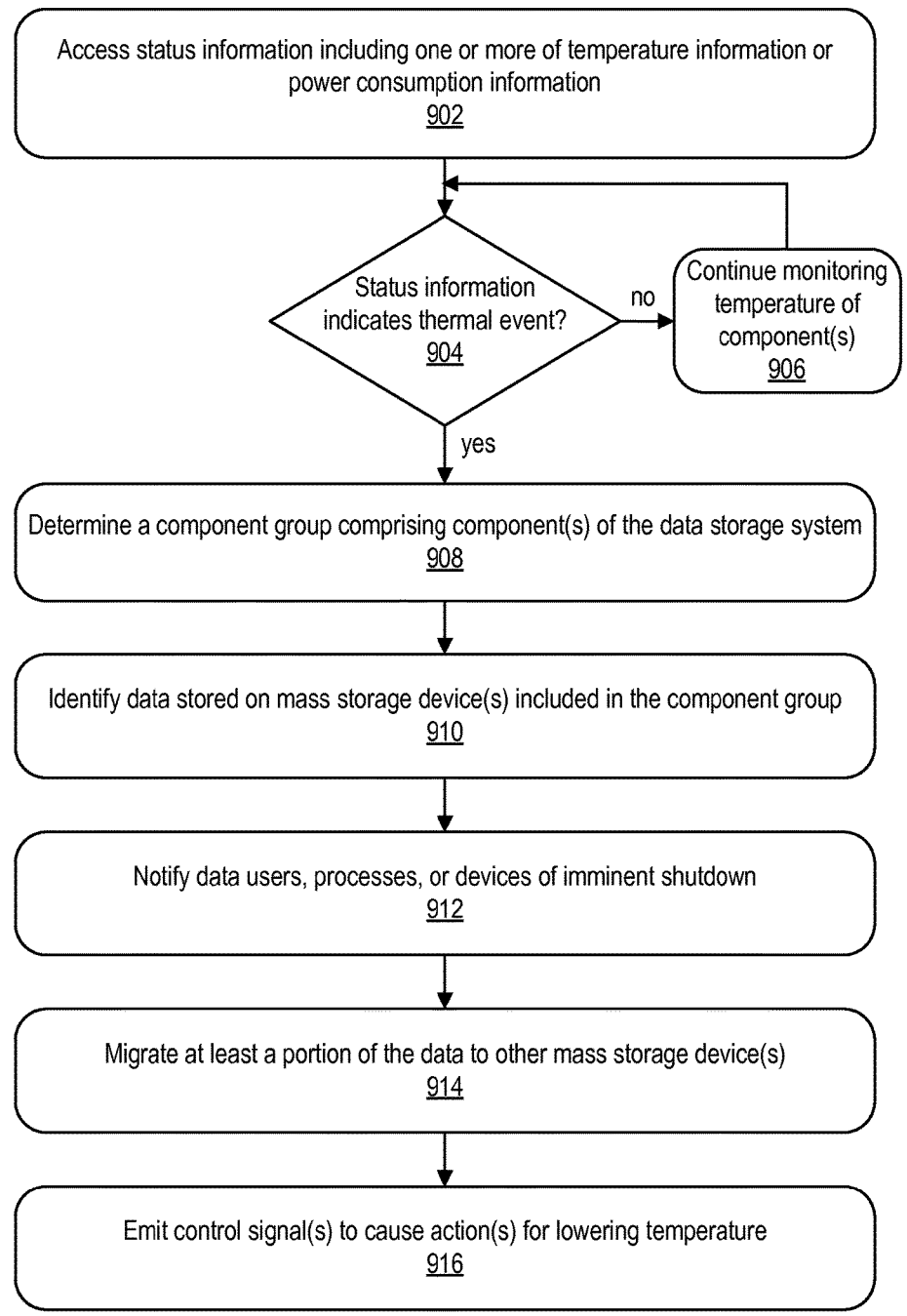
FIG. 9 is a flow diagram illustrating, according to exemplary embodiments, an example process for monitoring the temperature of one or more components, and performing action(s) in response to detected thermal events, including migrating data off of mass storage device(s) to be shut down.

FIG. 9 is a flow diagram illustrating, according to exemplary embodiments, an example process for monitoring the temperature of one or more components, and performing action(s) in response to detected thermal events, the action(s) comprising migrating data off of mass storage device(s) to be shut down. Operations of the process may be performed by one or more of the control device(s) 122, the control device(s) 310, or the external control device(s) 130.

At 902, the status information 124 is accessed. At 904, a determination is made whether the status information 124 indicates a thermal event. If not, the process may continuing monitoring at 906. If so, the process may proceed to 908 and determine a component group. The operations at 902, 904, 906, and 908 may proceed as described with reference to 602, 604, 606, and 608 respectively.

At 910, one or more control devices may identify data that is currently stored on one or more mass storage devices 110 included in the component group.

At 912, in cases where mass storage device(s) 110 are to be shutdown, one or more notifications may be sent to notify data consumers, operators, or other users of the imminent shutdown of the mass storage device(s) 110. Notification(s) may also be sent to processes or devices that access the data stored on the mass storage device(s) 110. Such notifications may enable processes or devices to adjust their behavior prior to the shutdown. For example, processes may discontinue queries or other data access operations that access the data stored on the mass storage device(s) 110, and redirect such operations to other device(s) that may redundantly store or mirror at least a portion of the data.

At 914, at least a portion of the stored data may be migrated to one or more other mass storage devices 110, to ensure that the data is available following the action(s) taken to mitigate the thermal event. In some cases, the data may be copied to other mass storage device(s) 110 and may remain stored on the mass storage device(s) 110 of the component group. Alternatively, the data may be stored on the other mass storage device(s) 110 and may be deleted from the mass storage device(s) 110 of the component group.

In some embodiments, the data may be copied to mass storage device(s) 110 that are unlikely to be the targets of subsequent action(s), if subsequent action(s) are performed to further address the thermal event. For example, if a mass storage device 110 is to be shut down in response to a thermal event, the data stored thereon may be migrated to other mass storage device(s) 110 that are not on the same backplane 108 or not in the same data storage module 106. This may ensure that the data remains available even if additional mass storage device(s) 110 in the backplane 108 or the data storage module 106 are subsequently shut off to address the thermal event.

At 916, one or more control signal(s) may be emitted to cause action(s) that mitigate the thermal event, as described with reference to 610. In some embodiments, at least a portion of the data that was migrated off of the mass storage device(s) 110 may be restored to the mass storage device(s) 110 following a determination that the thermal event is terminated.

In some embodiments, at least a portion of the data stored on mass storage device(s) 110 may be migrated to other mass storage device(s) 110 prior to action(s) that may shut down the mass storage device(s) 110. Moreover, in some embodiments the migrating of the data may itself be performed as an action to mitigate the thermal event. By migrating at least a portion of the data stored on mass storage device(s) 110 to other device(s), various embodiments may attempt to reduce the number of data access operations performed on particular mass storage device(s) 110 and thus lower the temperature of the mass storage device(s) 110. Further, action(s) may include redirecting at least some data access operations from mass storage device(s) 110 experiencing a thermal event to other mass storage device(s) 110 that may store the same data, to mitigate the thermal event.

Figure 10:
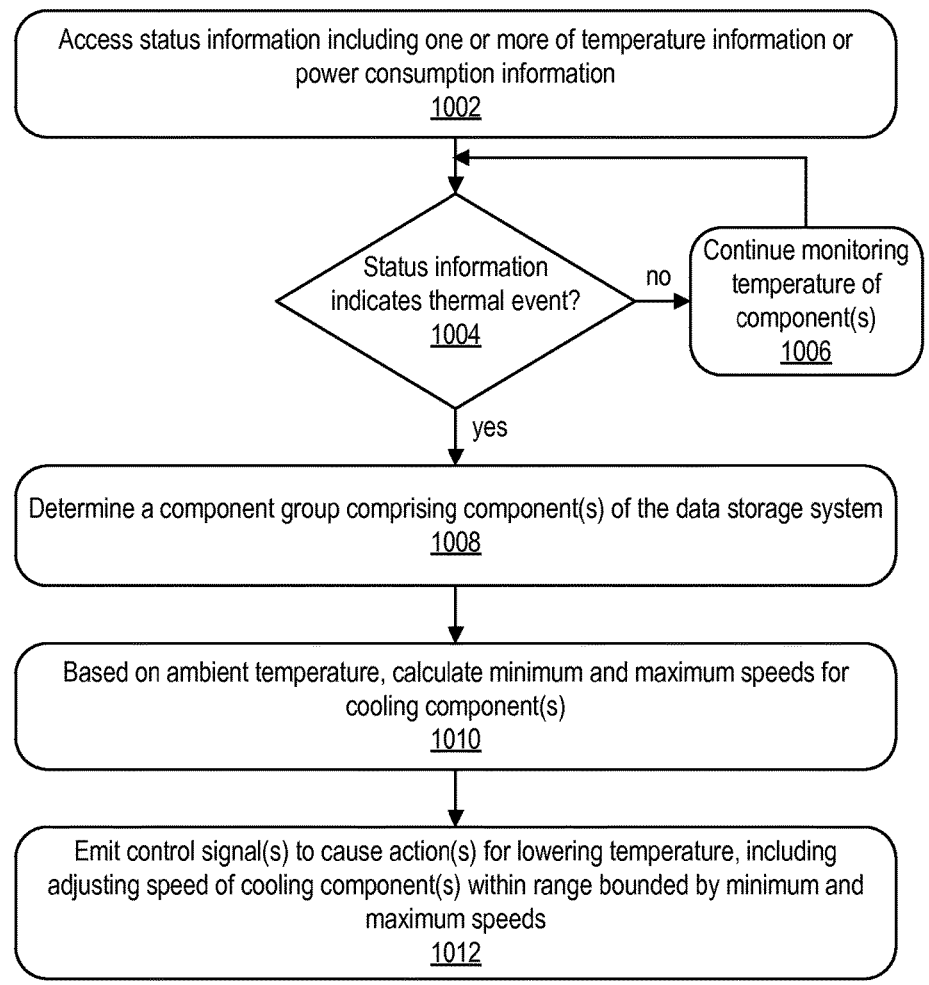
FIG. 10 is a flow diagram illustrating, according to exemplary embodiments, an example process for monitoring the temperature of one or more components, and performing action(s) in response to detected thermal events, including adjusting a speed of cooling component(s) within a range of speeds.

FIG. 10 is a flow diagram illustrating, according to exemplary embodiments, an example process for monitoring the temperature of one or more components, and performing action(s) in response to detected thermal events, the action(s) comprising adjusting a speed of cooling component(s) within a range of speeds. Operations of the process may be performed by one or more of the control device(s) 122, the control device(s) 310, or the external control device(s) 130.

At 1002, the status information 124 is accessed. At 1004, a determination is made whether the status information 124 indicates a thermal event. If not, the process may continuing monitoring at 1006. If so, the process may proceed to 1008 and determine a component group. The operations at 1002, 1004, 1006, and 1008 may proceed as described with reference to 602, 604, 606, and 608 respectively.

At 1010, a minimum speed and a maximum speed for one or more cooling components may be calculated based at least partly on an ambient temperature of the data storage system 100. An ambient temperature may be a current temperature of the air or other environment in proximity to one or more components of the data storage system 100. For example, the ambient temperature may be the temperature (e.g., average temperature) of the air in a computer room 202 of a data center 102 housing one or more racks 104. The ambient temperature may be described in the temperature information 126 included in the status information 124.

At 1012, one or more control signal(s) may be emitted to cause action(s) that mitigate the thermal event, as described with reference to 610. Such action(s) may include varying the speed (e.g., fan speed or blower speed) of one or more cooling components within the range bounded by the minimum speed and maximum speed determined at 1010.

In some embodiments, the ambient temperature may be employed to determine the range of speeds (e.g., fan speed or blower speed) within which cooling component(s) may operate. The control signal(s) may be sent to change the speed within the range. In some cases, the control signal(s) may indicate that the speed of cooling component(s) is to be stepped up or stepped down, and such stepping up or stepping down may be accomplished using a proportional-integral-derivative (PID) control of the cooling component(s).

In some embodiments, the control device(s) may cause different action(s) to be performed based on the particular temperature sensor(s) that detected the thermal event. Temperature sensor(s) may be characterized as absolute sensor(s) or relative sensor(s). Based on a determination than an absolute sensor has measured a temperature of a component that is above a threshold temperature, action(s) may be performed. The action(s) may be substantially consistent regardless of the extent to which the temperature exceeds the threshold temperature. For example, in response to an absolute sensor detecting an above-threshold temperature, action(s) may be performed to shut down component(s) of a component group, or increase the speed of cooling component(s) to a maximum speed, regardless of whether the temperature is 1 degree or 10 degrees above threshold.

In cases where a relative sensor measures a temperature of a component that is above a threshold temperature, action(s) may be performed based on the extent to which the temperature exceeds the threshold temperature. For example, if the temperature is 1 degree above a threshold temperature, first action(s) may be performed to shut down a first component group, or to increase the speed of cooling components by a first amount. If the temperature is 10 degrees above a threshold temperature, second action(s) may be performed to shut down a second component group that is larger than the first component group, or to increase the speed of cooling components by a second amount that is greater than the first amount. In response to a thermal event detected by a relative sensor, the particular action(s) performed may be relative to the difference between the threshold temperature and the determined temperature. Based on the difference, different action(s) may be performed, such as shutting down components instead of affecting the operations of cooling components. Also, based on the difference, different degrees of action(s) may be performed, such as shutting down more or fewer component(s) or adjusting cooling component(s) speed based on the temperature difference.

Figure 11:
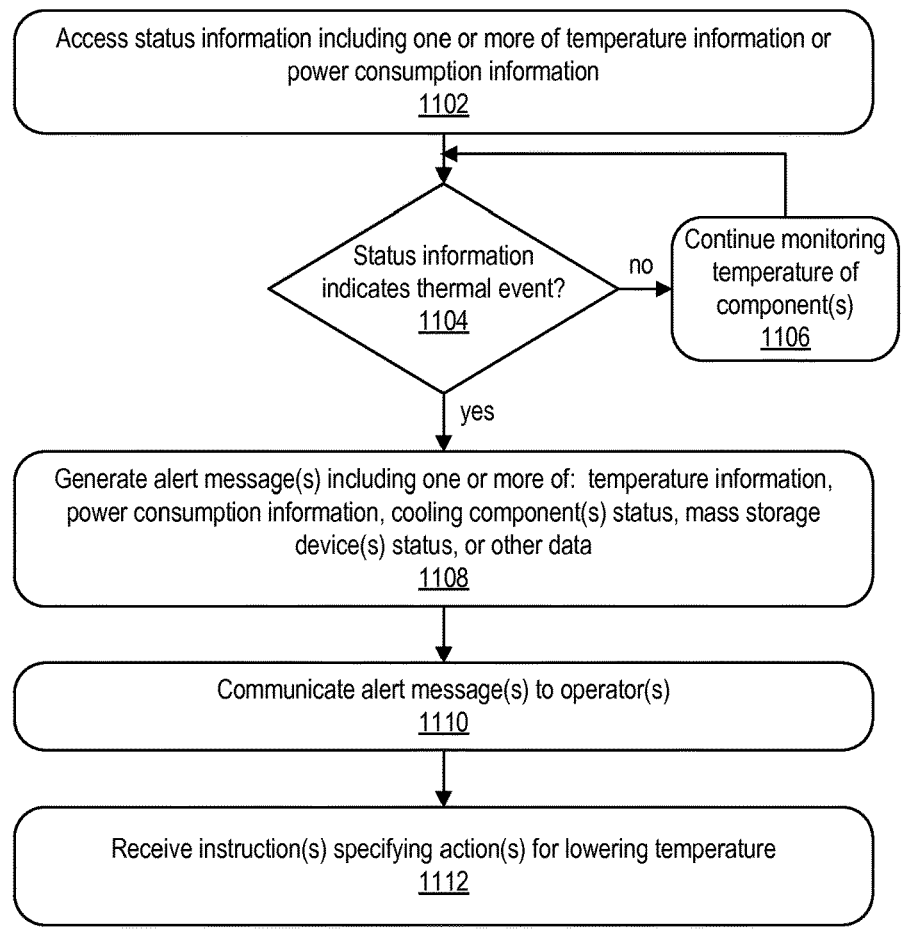
FIG. 11 is a flow diagram illustrating, according to exemplary embodiments, an example process for monitoring the temperature of one or more components, and generating alert message(s) in response to detected thermal events.

FIG. 11 is a flow diagram illustrating, according to exemplary embodiments, an example process for monitoring the temperature of one or more components, and generating alert message(s) in response to detected thermal events. Operations of the process may be performed by one or more of the control device(s) 122, the control device(s) 310, or the external control device(s) 130.

At 1102, the status information 124 is accessed. At 1104, a determination is made whether the status information 124 indicates a thermal event. If not, the process may continuing monitoring at 1106. If so, the process may proceed to 1108. The operations at 1002, 1004, and 1006 may proceed as described with reference to 602, 604, and 606 respectively.

At 1108, one or more alert messages may be generated. The alert message(s) may comprise information including, but not limited to, one or more of the following: the temperature of one more components of the data storage system 100, measured by temperature sensors or determined based on power the consumption information 128; the power consumption information 128 for one or more components of the data storage system 100; the status (e.g., power on or power off) of one or more components of the data storage system 100; the status of cooling component(s) such as whether the cooling component(s) are operating, current speed, or other operating conditions; or other information.

At 1110, the alert message(s) may be communicated or otherwise provided to one or more operators associated with the data storage system 100. In some cases, the alert message(s) may be communicated to operator(s) via e-mail, text message, voice message, push message, or any other communication technique. In some embodiments, the external control device(s) 130 may implement a user interface (UI) in which the alert message(s) may be presented. The UI may comprise a management console employable by operator(s) to monitor the status of component(s) in the data storage system 100. The UI may include a graphical UI (GUI), a command-line UI, or any other type of UI.

At 1112, instruction(s) may be received specifying one or more actions for mitigating the thermal event as described above. In some embodiments, the instruction(s) may be generated and communicated by the operator(s) in response to the alert message(s) sent at 1110. In some embodiments, the operator(s) may employ the UI of a management console to indicate the action(s) to be performed in response to the thermal event. The operator(s) may then monitor the temperature or other status of the component(s) and cause additional action(s) to be taken if the thermal event persists following the initial action(s).

Figure 12:
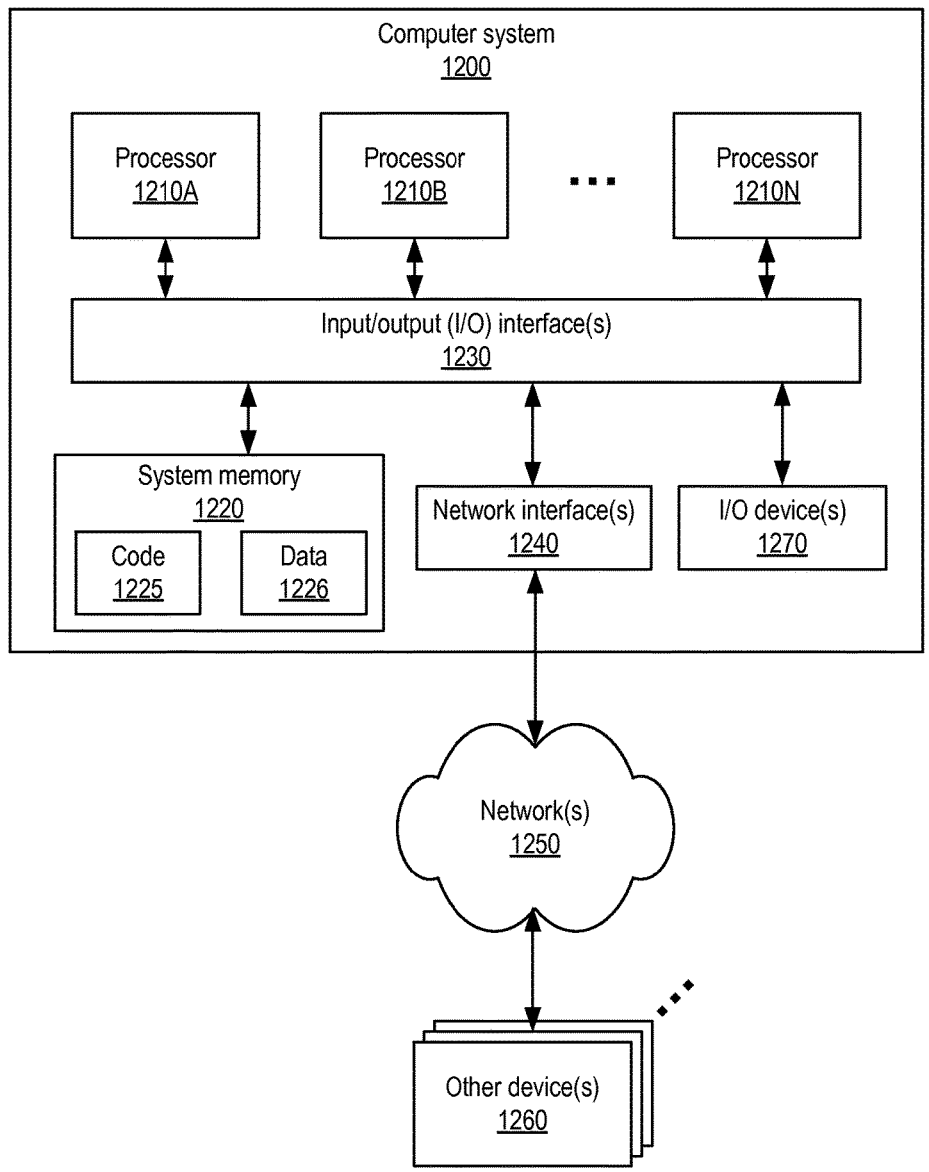
FIG. 12 is a block diagram illustrating an example computer system that may be employed in exemplary embodiments.

FIG. 12 is a block diagram illustrating an example computer system 1200 configured to implement at least a portion of the data storage system temperature management described herein according to various embodiments. The computer system 1200 may include any number of computing devices, and may execute or otherwise include any number of software modules such as applications, processes, libraries, interfaces, application programming interfaces (APIs), and so forth. For example, computer system 1200 may be configured to implement one or more of the control device(s) 122, the external control device(s) 130, or the control device(s) 310. The computer system 1200 may include any type of computing device including but not limited to: a rack-mounted computing device, a personal computer system, a desktop computer, a laptop or notebook computer, a tablet computer, an electronic book (e-book) reader, a wearable computer, an implanted computer, a mainframe computer system, a distributed computing device (e.g., cloud server), a handheld computer, a workstation, a network computer, a consumer device, an automotive computer, a home entertainment device, a smart appliance, a storage device, a telephone, a remote control, a game controller, a gaming system, a mobile telephone, a smartphone, or any other type of computing device.

The computing system 1200 may include one or more physical computing devices. The computing system 1200 may also include one or more of a virtual computing environment, a hypervisor, an emulation, or a virtual machine executing on one or more physical computing devices. In some embodiments, the computing system 1200 may comprise a cluster, cloud, farm, or other grouping of multiple devices that coordinate operations to provide load balancing, failover support, parallel processing capabilities, shared storage resources, or other aspects.

Computer system 1200 may include one or more processors 1210 coupled to a system memory 1220 via one or more input/output I/O interfaces 1230. One or more of the processor(s) 1210 may include multiple cores, which may be configured to execute single-threaded or multi-threaded code. In various embodiments, computer system 1200 may be a uniprocessor system including one processor 1210, or a multiprocessor system including multiple processors 1210 (e.g., two, four, eight, or any other number). The processor(s) 1210 may include any processor(s) capable of executing instructions. For example, in various embodiments, the processor(s) 1210 may include general-purpose or embedded processor(s) implementing any of a variety of instruction set architectures (ISAs), such as the x86, PowerPC, SPARC, or MIPS ISAs, or any other ISA. In multiprocessor systems, each of processors 1210 may implement the same ISA. Alternatively, different ones of the processors 1210 may implement different ISAs.

The computer system 1200 may include one or more system memories 1220, described herein as system memory 1220, configured to store one or more of code 1225 or data 1226 such that the code 1225 and the data 1226 are accessible by the processor(s) 1210. The system memory 1220 may comprise one or more computer-readable storage media that include one or more of the following: an electronic storage medium, a magnetic storage medium, an optical storage medium, a quantum storage medium, a mechanical computer storage medium, a solid state storage medium, and so forth. The system memory 1220 may be implemented using any memory technology, including but not limited to one or more of the following: read-only memory (ROM), random access memory (RAM), static RAM (SRAM), dynamic RAM (DRAM), Rambus DRAM (RDRAM), extended data out (EDO) RAM, synchronous DRAM (SDRAM), double data rate SDRAM (DDR SDRAM), electrically erasable programmable ROM (EEPROM), flash memory, non-volatile memory, volatile memory, or any other type of memory. The system memory 1220 may be incorporated into the computer system 1200. In some cases, at least a portion of the system memory 1220 may be external to the computer system 1200 and accessible via the network interface(s) 1240 or the I/O device(s) 1270.

The system memory 1220 may include the code 1225. The code 1225 may include executable instructions that are executable by processor(s) 1210 to implement the various embodiments as described herein. The code 1225 may implement one or more executable software modules, such as applications, programs, processes, libraries, interfaces, APIs, scripts, routines, and so forth. The code 1225 may be in a compressed or uncompressed form. The code 1225 may be in an encrypted or unencrypted form. The code 1225 may include any number of instructions that may be employed to program a computing device, or other electronic device, to perform the operations described herein. The code 1225 may be arranged in any format and according to any language. In some embodiments, the code 1225 may include machine-executable binary instructions that are configured to execute on the processor(s) 1210, the instructions generated by compiling, linking, or otherwise processing source code written in any programming language. In some embodiments, the code 1225 may include intermediate language instructions (e.g., bytecodes) that execute within a runtime application such as a Java™ Virtual Machine (JVM), C#™ runtime, or any other runtime, interpreter, virtual machine, or execution engine running on the computer system 1200. In some embodiments, the code 1225 may include instructions written in a scripting language or interpreted language, such as JavaScript™, ActiveScript™, VBScript™, Perl™, and so forth. In such cases, the code 1225 may execute within a runtime, interpreter, virtual machine, scripting engine, or other process that executes on the computer system 1200.

The code 1225 may include instructions to perform operations as described with reference to FIGS. 5-9. The code 1225 may also include instructions to implement at least one operating system OS that executes on the computer system 1200. The at least one OS may include one or more of the following: any version of the UNIX™ OS; any version of the Linux™ OS; any version of iOS™ or OSX™ from Apple Corp. of Cupertino, Calif., USA; any version of Windows™ or Windows Mobile™ from Microsoft Corp. of Redmond, Wash., USA; any version of Android™ from Google Corp. of Mountain View, Calif., USA and its derivatives from various sources; any version of Palm OS™ from Palm Computing, Inc. of Sunnyvale, Calif., USA and its derivatives from various sources; any version of BlackBerry OS™ from Research In Motion Ltd. of Waterloo, Ontario, Canada; any version of VxWorks™ from Wind River Systems of Alameda, Calif., USA; or other operating systems.

The system memory 1220 may include data 1026 employed during operations of the computer system 1200. The data 1226 may include at least a portion of the status information 124. The data 1226 may be stored in any format. In some embodiments, at least a portion of the data 1226 may be stored externally to the computer system 1200, on one or more other devices or storage media that may communicate with the computer system 1200 via the network interface(s) 1240, the I/O interface(s) 1230, or the I/O device(s) 1270. The system memory 1220 may include persistent storage such as one or more hard drives, tape drives, solid state memory, other mass storage devices, or any other persistent storage device. The system memory 1220 may also include active memory, physical memory, or virtual memory that is employed by processes executing on the computer system 1200. The system memory 1220 may include cache memory.

The system memory 1220 may comprise one or more non-transitory storage media that store information such as one or both of the code 1225 or the data 1226. Non-transitory storage media may store information in any arrangement, and using any storage technology, such that the stored information is computer-readable, i.e., readable by a machine such as a computing device. Non-transitory storage media may include any media that is configured to store information such that the stored information persists for at least a minimum duration relative to the operations described herein. Non-transitory storage media may include any media that is transportable as a physical object. Various embodiments may include software comprising one or both of the code 1225 or the data 1226 stored on the system memory 1220 that comprises one or more non-transitory storage media. Such software may be used to program the computer system 1200, or other electronic devices, to perform one or more operations according to various embodiments.

Various embodiments may also include software that is transmitted in a transitory form as an electromagnetic transmission, optical transmission, acoustical transmission, or any other type of signal or communication. Such software may be communicated using any communication protocol over the Internet or any other communications network, using a wired or wireless communication path. In such cases, the software may be received using the network interface(s) 1240 and employed to program the computer system 1200, or other electronic devices, to perform one or more operations according to various embodiments.

The I/O interface(s) 1230 may be configured to coordinate I/O traffic between the processor(s) 1210, the system memory 1220, and any peripheral devices accessible to the computer system 1200 through the network interface(s) 1240 or other peripheral interface(s). In some embodiments, the I/O interface(s) 1230 may perform protocol, timing or other data transformations to convert data from one component (e.g., the system memory 1220) into a format suitable for use by another component (e.g., the processor(s) 1210). In some embodiments, the I/O interface(s) 1230 may include support for devices attached through various types of peripheral buses that support any bus standard such as any variant of the Peripheral Component Interconnect (PCI) bus standard or the Universal Serial Bus (USB) standard. In some embodiments, the function of I/O interface(s) 1230 may be split into two or more separate components, such as a north bridge and a south bridge. Moreover, in some embodiments at least some of the functionality of I/O interface(s) 1230, such as an interface to the system memory 1220, may be incorporated directly into the processor(s) 1210.

The computer system 1200 may include one or more network interfaces 1240 coupled to the I/O interface(s) 1230. The one or more network interfaces 1240 may be employed by the various components or software of the computer system 1200 to communicate with other systems and/or components over one or more communications networks 1250. The network interface(s) 1240 may include one or more network interface controllers (NICs), transceiver devices, or other types of network communications devices configured to send and receive communications over the network(s) 1250.

The computer system 1200 may employ the network interface(s) 1240 to communicate and exchange data with one or more other devices 1260 over the network(s) 1250. The network interface(s) 1240 may support one or more wireless networking protocols such as any version of the Institute of Electrical and Electronics Engineers (IEEE) 802.11 standard or other wireless networking standard. The network interface(s) 1240 may also support communication via any wired data networks, such as Ethernet networks. The network interface(s) 1240 may also support communication via any telecommunications or telephony network such as analog voice networks or digital fiber communications networks, via storage area networks such as Fibre Channel storage area networks (SANs), or via any other suitable type of network and/or protocol.

In some embodiments, the network interface(s) 1240 may be configured to enable communication between the computer system 1200 and one or more I/O devices 1270, or between the computer system 1200 and external (e.g., remote) storage device(s). The I/O device(s) 1270 may include one or more data input devices such as a keyboard, a keypad, a mouse, a pen, a game controller, a touch input device, an audio input device (e.g., a microphone), a gestural input device, a haptic input device, an image or video capture device (e.g., a camera), or other data input devices. In some cases, the I/O device(s) 1270 may include one or more data output devices such as a display, an audio output device (e.g., a speaker), a printer, a haptic output device, and so forth.

The I/O device(s) 1270 may be components of all the devices included in the computer system 1200 or may be components of different devices that comprise the computer system 1200. The I/O device(s) 1270 may be physically incorporated with the computer system 1200. In some embodiments, one or more of the I/O device(s) 1270 may be externally placed relative to the computer system 1200 and may communicate with the computer system 1200 using a wired or wireless connection, such as over the network interface(s) 1240. In various embodiments, the computer system 1200 may include more, fewer, or different components than those illustrated in FIG. 12.

The network(s) 1250 may include public networks such as the Internet, private networks such as an institutional or personal intranet, or some combination of private and public networks. The network(s) 1250 may include any type of wired or wireless network, including but not limited to local area networks (LANs), wide area networks (WANs), wireless WANs (WWANs), wireless LANs (WLANs), mobile communications networks (e.g., 3G, 4G, etc.), and so forth. The various computing systems, devices, and processes described herein may employ the network(s) 1250 for communication. Such communications may be encrypted or otherwise secured. For example, such communications may employ one or more public or private cryptographic keys, ciphers, digital certificates, or other credentials supported by a security protocol, such as any version of the Secure Sockets Layer (SSL) or the Transport Layer Security (TLS) protocol. The network(s) 1250 may include the network(s) 132.

The various methods, processes, and routines illustrated in the figures and described herein represent example embodiments. The methods may be implemented as software, as hardware, as manual operations, or as any combination thereof. The order of operations performed by any method, process, or routine described herein may be changed, and one or more operations may be added, reordered, combined, omitted, or modified. The operations may be performed serially or in parallel. In cases where the methods, process, and routines described herein are implemented as computer programs, any number of instances of these programs may be executed on any number of separate computer systems or on the same computer system. Although certain operations may be described herein as performed by particular devices, software programs, processes, or entities, embodiments are not limited to these examples. A variety of alternative embodiments will be understood by those having ordinary skill in the art.

Although the exemplary embodiments above have been described in considerable detail, numerous variations and modifications may be made as would become apparent to those skilled in the art once the above disclosure is fully appreciated. It is intended that the following claims be interpreted to embrace all such modifications and changes and, accordingly, the above description to be regarded in an illustrative rather than a restrictive sense.

What is claimed is:

1. A system, comprising:
a rack;
a data storage module coupled to the rack, the data storage module comprising:
  a first backplane;
  at least one first mass storage device coupled to the first backplane;
  at least one second backplane;
  at least one second mass storage device coupled to the at least one second backplane; and
a control device configured to:
  access status information indicating:
    a first current temperature of at least one of the first backplane or the at least one first mass storage device;
    a second current temperature of at least one of the at least one second backplane or the at least one second mass storage device;
  determine that the first current temperature exceeds a first threshold temperature and that the second current temperature does not exceed the first threshold temperature;
  responsive to the first current temperature exceeding the first threshold temperature, emit at least one signal to cause a shutdown of the at least one first mass storage device coupled to the first backplane while the at least one second mass storage device remains operative; and
  subsequent to the shutdown of the at least one first mass storage device:
    responsive to a determination that the first current temperature is greater than a second threshold temperature and less than the first threshold temperature, wherein the second threshold temperature is less than the first threshold temperature, maintain the shutdown of the at least one first mass storage device; and
    responsive to a determination that the first current temperature is less than the second threshold temperature, emit at least another signal to cause a restart of the at least one first mass storage device.

2. The system of claim 1, wherein:
the rack comprises at least one power distribution unit (PDU) communicatively coupled to the control device, the at least one PDU configured to provide power to the first backplane and the second backplane;
the control device is further configured to send the at least one signal to the at least one PDU; and
the at least one PDU is further configured to, responsive to receiving the at least one signal, interrupt the power to the first backplane to cause the shutdown of the at least one first mass storage device coupled to the first backplane.

3. The system of claim 1, wherein:
the control device is communicatively coupled to the at least one first mass storage device;
the control device is further configured to send the at least one signal to the at least one first mass storage device; and
the at least one first mass storage device is configured to initiate the shutdown responsive to receiving the at least one signal.

4. A system, comprising:
one or more data storage modules configured to couple to a rack, the one or more data storage modules comprising one or more backplanes configured to couple to one or more mass storage devices; and
a control device configured to:
  determine a temperature of one or more of the rack, the one or more data storage modules, the one or more backplanes, or the one or more mass storage devices;
  responsive to the temperature exceeding a first threshold temperature, determine a component group comprising one or more of the rack, the one or more data storage modules, the one or more backplanes, or the one or more mass storage devices;
  emit at least one signal to cause at least one action for lowering the temperature, the at least one action comprising one or more of:
    a shutdown of the component group, wherein at least one of the one or more mass storage devices remains active after the shutdown of the component group;
    a reduction in a number of operations performed in the component group;
    a speed adjustment for at least one cooling component arranged to move air in proximity to the component group; or
    a reduction in power supplied to the component group; and
  subsequent to performance of the at least one action:
    responsive to a determination that the temperature is greater than a second threshold temperature and less than the first threshold temperature, wherein the second threshold temperature is less than the first threshold temperature, maintain the at least one action; and
    responsive to a determination that the temperature is less than the second threshold temperature, emit at least another signal to cause at least a partial reversal of the at least one action.

5. The system of claim 4, wherein:
the component group is a first component group;
the at least one signal is at least one first signal;
the at least one action is at least one first action; and
the control device is further configured to:
  responsive to the temperature continuing to exceed the first threshold temperature after the at least one first action, determine a second component group comprising more mass storage devices than the first component group; and
  emit at least one second signal to cause at least one second action for lowering the temperature, the at least one second action comprising one or more of:
    a shutdown of the second component group; or
    a speed adjustment for at least another cooling component arranged to move air in proximity to the second component group.

6. The system of claim 5, wherein:
the temperature is of a backplane of the one or more backplanes;
the first component group comprises a subset of the one or more mass storage devices coupled to the backplane; and
the second component group comprises the backplane.

7. The system of claim 4, wherein:
the control device is further configured to access status information describing the temperature as measured by at least one temperature sensor arranged to measure the temperature of the one or more of the one or more data storage modules, the one or more backplanes, or the one or more mass storage devices.

8. The system of claim 4, wherein the control device is further configured to:
access status information that indicates a power consumption of at least one of the one or more data storage modules, the one or more backplanes, or the one or more mass storage devices; and
determine the temperature based at least partly on the power consumption.

9. The system of claim 4, wherein the control device is further configured to calculate the temperature of a given mass storage device as at least a function of:
an ambient temperature as measured at a location, in the data storage module, separate from the given mass storage device;
a power consumption of the given mass storage device;
a location of the given mass storage device in the data storage module;
an airflow in proximity to the given mass storage device; or
a previously calibrated thermal resistance of the given mass storage device.

10. The system of claim 4, wherein:
the control device is further configured to cause the at least one signal to be communicated to one or more of:
at least one microcontroller of at least one mass storage device included in the component group; or
at least one control device that controls operations performed on the at least one mass storage device; and
the at least one action further comprises instructing one or more of the at least one microcontroller or the at least one control device to reduce the number of operations performed on the at least one mass storage device.

11. The system of claim 4, wherein:
the control device is further configured to send the at least one signal to a power distribution unit (PDU) that is configured to provide power to the one or more backplanes; and
the PDU is configured to, responsive to receiving the at least one signal, interrupt the power to the one or more backplanes included in the component group to cause the shutdown of the one or more mass storage devices coupled to the one or more backplanes.

12. The system of claim 4, wherein the at least one action is based, at least partly, on a difference between the temperature and the threshold temperature.

13. A method, comprising:
accessing status information indicating a temperature of one or more components of a data storage system, the one or more components including one or more of: a mass storage device, a backplane coupled to the mass storage device, or a data storage module that includes the backplane;
based on the status information, detecting a thermal event in the data storage system, wherein the thermal event is associated with the temperature exceeding a first threshold temperature;
determining a component group comprising the at least one of the one or more components associated with the thermal event; and
emitting at least one signal to cause at least one action in response to the thermal event, the at least one action comprising one or more of:
a shutdown of the component group, wherein at least one of the one or more mass storage devices remains active after the shutdown of the component group;
a reduction in power supplied to the component group;
a reduction of activity in the component group; or
a speed adjustment to increase a speed of at least one cooling component arranged to move air in proximity to the component group;
subsequent to causing the at least one action:
responsive to a determination that the temperature is between the first threshold temperature and a second threshold temperature, maintaining the at least one action, wherein the first threshold temperature is greater than the second threshold temperature; and
responsive to a determination that the temperature is less than the second threshold temperature, emitting at least another signal to cause at least partial reversal of the at least one action.

14. The method of claim 13, further comprising:
determining, based on the status information, an ambient temperature in proximity to the data storage system;
determining, based at least partly on the ambient temperature, a minimum speed and a maximum speed for the at least one cooling component; and
configuring the at least one signal to cause the speed adjustment within a range bounded by the minimum speed and the maximum speed.

15. The method of claim 13, further comprising:
accessing power consumption information that indicates a power consumption of at least one of the one or more components, the power consumption information received from the at least one of the one or more components; and
determining the temperature further based, at least partly, on the power consumption.

16. The method of claim 13, further comprising:
identifying data stored on the one or more mass storage devices included in the component group; and
prior to the shutdown of the component group, migrating at least a portion of the data to at least one other mass storage device.

17. The method of claim 13, wherein the thermal event is characterized by a change in the temperature during a time period exceeding a threshold change.

* * * * *